US011638430B2

(12) United States Patent
Jensen et al.

(10) Patent No.: US 11,638,430 B2
(45) Date of Patent: May 2, 2023

(54) DEVICE AND METHOD FOR SCALDING SLAUGHTERED POULTRY

(71) Applicant: BAADER FOOD SYSTEMS DENMARK A/S, Trige (DK)

(72) Inventors: Jonas Jensen, Trige (DK); Karsten Nielsen, Trige (DK); Per Thorup, Trige (DK)

(73) Assignee: BAADER FOOD SYSTEMS DENMARK A/S, Trige (DK)

( * ) Notice: Subject to any disclaimer, the term of this patent is extended or adjusted under 35 U.S.C. 154(b) by 0 days.

(21) Appl. No.: 17/779,099

(22) PCT Filed: Mar. 6, 2020

(86) PCT No.: PCT/EP2020/056022
§ 371 (c)(1),
(2) Date: May 23, 2022

(87) PCT Pub. No.: WO2021/175438
PCT Pub. Date: Sep. 10, 2021

(65) Prior Publication Data
US 2022/0408742 A1    Dec. 29, 2022

(51) Int. Cl.
*A22C 21/00* (2006.01)
*A22C 21/04* (2006.01)
(52) U.S. Cl.
CPC .......... *A22C 21/04* (2013.01); *A22C 21/0046* (2013.01); *A22C 21/0053* (2013.01)
(58) Field of Classification Search
CPC ................................ A22C 21/00; A22C 21/04

USPC ......................................................... 452/173
See application file for complete search history.

(56) References Cited

U.S. PATENT DOCUMENTS

| | | | |
|---|---|---|---|
| 2,667,661 A | 2/1954 | Long | |
| 2,668,661 A | 2/1954 | Long | |
| 4,947,518 A | 8/1990 | Covell, III | |
| 4,961,248 A | 10/1990 | Criscione, II et al. | |

(Continued)

FOREIGN PATENT DOCUMENTS

| CN | 102223804 A | 10/2011 |
|---|---|---|
| CN | 107427015 A | 12/2017 |

OTHER PUBLICATIONS

International Search Report from PCT/EP2020/056022, dated Nov. 27, 2020, 2 pages.

(Continued)

*Primary Examiner* — Richard T Price, Jr.
(74) *Attorney, Agent, or Firm* — Dinsmore & Shohl LLP

(57) ABSTRACT

An apparatus, configured and adapted for scalding slaughtered poultry, includes a scalding tank, which is open at the top, for receiving and for holding a liquid scalding medium, and a transport means, arranged above the scalding tank, for transporting the poultry in a hanging manner within the scalding tank along a scalding channel formed of a plurality of scalding channel sections from an input region to an output region. There is formed beneath the scalding channel a receiving compartment for scalding medium. There is arranged inside the receiving compartment at least one pump device as a turbulence-generating body for forming a pressure chamber which acts along the entire scalding channel. A corresponding method is also provided.

25 Claims, 15 Drawing Sheets

(56) References Cited

U.S. PATENT DOCUMENTS

| | | | | |
|---|---|---|---|---|
| 5,190,494 A | * | 3/1993 | Martin | A22C 21/04 |
| | | | | 452/78 |
| 5,232,394 A | * | 8/1993 | Covell, III | A22C 21/04 |
| | | | | 452/74 |
| 2011/0287703 A1 | | 11/2011 | Van Esbroeck et al. | |
| 2018/0035683 A1 | | 2/2018 | Thrane et al. | |

OTHER PUBLICATIONS

International Search Report dated Nov. 27, 2020; International Application PCT/EP2020/056022.

* cited by examiner

Schnitt B-B

DEVICE AND METHOD FOR SCALDING SLAUGHTERED POULTRY

CROSS-REFERENCE TO RELATED APPLICATIONS

This application is the U.S. National Stage of PCT/EP2020/056022 filed on Mar. 6, 2020, the entire content of is incorporated herein by reference in its entirety.

FIELD OF THE INVENTION

The invention relates to an apparatus, configured and adapted for scalding slaughtered poultry, comprising an elongate scalding tank, which is closed on all sides by side walls and end walls and at the bottom by a base wall and which is open at the top, for receiving and for holding a liquid scalding medium, a transport means, arranged above the scalding tank, for transporting the poultry in a hanging manner within the scalding tank along a scalding channel formed of a plurality of scalding channel sections from an input region to an output region, wherein at least two transport lines for the poultry are formed within the scalding tank, each from one end wall of the scalding tank to the opposite end wall of the scalding tank, and the transport lines are connected to one another by means of curved connecting lines for 180-degree deflection, wherein each transport line and each connecting line is delimited by two partition walls, which are arranged spaced apart from one another transversely to the transport direction, and a base wall to form linear scalding channel sections which are open at the top and curved scalding channel sections which are open at the top, wherein partition walls of adjacent scalding channel sections and partition walls that are situated adjacent to outside walls of the scalding tank are arranged spaced apart from one another to form a free space for the scalding medium, wherein means for supplying and/or warming the scalding medium are associated at least with the free spaces of adjacent scalding channel sections, and wherein there is formed beneath at least parts of the scalding channel, namely at least between the base walls of the linear scalding channel sections and the base wall of the scalding tank, a receiving compartment for scalding medium which, together with the free spaces, forms a common chamber with which there is associated at least one turbulence-generating body for generating turbulence and/or flow of the scalding medium in the scalding tank.

The invention relates further to a method for scalding slaughtered poultry, comprising the steps: transporting the poultry, hanging by the feet, through a scalding tank, which is at least partially filled with liquid scalding medium, by means of a transport means in a transport direction T from an input region to an output region along a scalding channel comprising linear and curved scalding channel sections, warming and/or supplying the scalding medium by means of means for warming and/or supplying the scalding medium, and generating turbulence in the scalding medium within the scalding tank by means of at least one turbulence-generating body, whereby the scalding medium is guided from a receiving compartment beneath the scalding channel piecewise back into the scalding channel from above.

BACKGROUND OF THE INVENTION

Such apparatuses and methods are used in the poultry-processing industry. In order to prepare the plumage of the poultry, which includes inter alia chickens, turkeys, ducks, geese and other fowl and waterfowl which have feathers and are to be processed in the foodstuffs industry, for the actual displuming or plucking of the feathers, the feathers are in effect softened or loosened in the region of the quills by the warmed/heated scalding medium. To this end, the poultry is exposed to the scalding medium, such as, for example, hot steam or hot water, along a scalding channel. As the poultry, suspended by the feet and/or legs, is transported along the scalding channel, or in the scalding channel, in the transport direction T, the poultry is immersed in the scalding medium in the scalding tank either not at all, partially or wholly, so that the scalding medium washes around it to a greater or lesser degree. Specifically in the case of apparatuses and methods in which the poultry is immersed wholly or at least partially in the scalding medium, that is to say the scalding medium is at such a level in the scalding tank that it is not only in the receiving compartment beneath the scalding channel but also along and within the entire scalding channel, the poultry is pulled by the scalding medium as it is transported through the scalding channel, whereby—suspended by the feet/legs—it floats owing to the transport speed. In other words, the scalding medium forms a resistance and "brakes" the poultry, so that, as a result of being transported further, it is pulled into a slanting position and, in the most unfavourable case, comes to the surface, which is referred to as floating.

In order to form a sufficiently long scalding line, the scalding channel has at least two transport lines. Each transport line extends linearly from one end wall to the opposite end wall and runs substantially parallel to the side walls. In order to connect the linear transport lines, connecting lines for 180-degree deflection are provided. Linear transport lines as well as curved connecting lines are formed of two partition walls, which are arranged spaced apart from one another, and a base wall, so that linear or curved scalding channel sections that are U-shaped in cross-section are formed. In an apparatus having two transport lines, two linear scalding channel sections are accordingly formed, which are connected and deflected by one curved scalding channel section. In the case of three transport lines, three linear scalding channel sections are formed, which are connected and deflected by two curved scalding channel sections. In known apparatuses having two or more transport lines, the transport lines are thus guided through the scalding tank in effect in a meandering manner, with the result that deflections occur in order to transport the poultry from the input region to the output region. Depending on the transport direction, the input region can also be the output region and vice versa. The input region and the output region can be arranged at one end wall or at opposite end walls.

In addition to immersing the poultry in the scalding medium, the poultry is exposed to scalding medium which is circulating within the scalding tank by generating turbulence in the liquid scalding medium so that, in some regions along the scalding channel, it flows out of the receiving compartment located beneath the scalding channel and back into the scalding channel from above over free edges of partition walls delimiting the scalding channel. The poultry, in particular when it is not or is only partially immersed in the scalding medium within the scalding channel, is thereby in the first place or additionally supplied with or exposed to the scalding medium.

The scalding medium is usually warmed water, which is either supplied in the already warmed state and/or is not warmed until it is in the scalding tank. However, the scalding medium can also be water provided with additives, or any other flowable medium. The scalding medium, at least in the region of the base wall of the scalding tank, is located in a receiving compartment beneath the scalding channel. The free spaces, which are formed between partition walls of adjacent scalding channel sections and between partition walls and side walls and end walls of the scalding tank, and the receiving compartment are fluidically connected to one another and form a chamber. Turbulence is generated in the scalding medium by the or each turbulence-generating body, and the scalding medium flows out of the receiving compartment, which in known apparatuses is formed only beneath the linear scalding channel sections, upwards through the free spaces and then flows into the scalding channel again from above over free edges of the partition walls delimiting the scalding channel, but this overflow is limited to the linear scalding channel sections beneath which the receiving compartment is situated. By means of this overflowing, the poultry is exposed to the scalding medium along the linear scalding channel sections. By means of the flow generated in the receiving compartment, or in the chamber, the scalding medium is in effect drawn by suction out of the scalding channel in the region of the linear scalding channel sections and guided upwards along the free spaces, where it flows back into the scalding channel over the free edges of the partition walls in the manner of a waterfall. The suction effect in the region of the base wall of the linear scalding channel sections has the result that, in the case where the poultry is immersed at least partially in the scalding medium, poultry transported in the scalding channel is pulled downwards by a vertically downwardly directed pulling force and is stabilised in the hanging, vertically oriented position and against the floating effect. In the curved scalding channel sections, both the overflow of the scalding medium into the scalding channel from above and the suction effect for stabilising the vertically downwardly oriented position of the poultry are absent. Specifically in the region of the curved scalding channel sections, the scalding process is at least partly interrupted or reduced, which leads to uneven and unsatisfactory scalding results.

Increasingly higher demands are being made of the efficiency of such apparatuses and methods. In other words, higher throughput rates are required, which are achieved by increasing the transport speed through the scalding tank. However, an increased transport speed intensifies the above-mentioned undesirable effects, so that the scalding result is impaired even further. Existing apparatuses and methods have accordingly reached or already exceeded their performance limit for an acceptable scalding result.

Accordingly, the object underlying the invention is to provide an apparatus which on the one hand ensures a high transport speed of the poultry through the scalding tank and on the other hand delivers an optimum scalding result. The object consists further in proposing a corresponding method.

SUMMARY OF THE INVENTION

This object is achieved by an apparatus having the features mentioned hereinbefore in that the receiving compartment extends beneath the entire scalding channel, that is to say between the base walls of the linear and of the curved scalding channel sections on the one hand and the base wall of the scalding tank on the other hand, wherein there is arranged in the receiving compartment, which as a result extends into the region of the curved scalding channel sections, at least one pump device as a turbulence-generating body for forming a pressure chamber which extends along the entire scalding channel. By forming a pressure chamber which covers the entire scalding tank, that is to say exerts its suction and pumping effect throughout the scalding channel over its entire length, namely irrespective of where the or each pump device is positioned along the scalding channel, the liquid scalding medium, by means of the or each pump device, is drawn by suction downwards out of the scalding channel in the region of the base wall and pumped upwards back into the scalding channel via the receiving compartment and the free spaces, in such a manner that the liquid scalding medium flows over the free edges of the partition walls on both sides, namely along the linear and curved scalding channel sections. With this configuration according to the invention of the apparatus, a dual effect is achieved in a surprisingly simple and effective manner. On the one hand, the or each pump device causes a suction effect in and along the entire scalding channel, namely both in the linear scalding channel sections and in the curved scalding channel sections, whereby the poultry situated in the scalding channel, in the case where the poultry is immersed at least partially in the scalding medium, is pulled downwards and thus aligned and stabilised in the vertically oriented position. As a result, the effect of floating, in particular also in the deflection regions, that is to say the curved scalding channel sections, is effectively counteracted even and in particular at a high transport speed. The poultry is thereby reliably held wholly or partially beneath the surface of the scalding medium for maximum exposure thereto. In other words, the suction effect acting over the entire length of the scalding channel allows the poultry to be transported at a higher speed through the apparatus while the scalding result remains the same or is even improved. On the other hand, the flow over the partition walls that is generated on both sides along the entire scalding channel, namely both in the linear scalding channel sections and in the curved scalding channel sections, even in the case where, owing to a low fill level of the scalding tank, the poultry is not or is only partially immersed in the scalding medium, ensures a sufficient, even and continuous exposure of the poultry hanging freely and above the surface of the scalding medium or immersed only partially in the scalding medium. Because the scalding medium flows onto the poultry from above on both sides, the poultry is additionally pushed downwards. The constant gush of water on both sides, which acts on the poultry from above, positions the poultry in the middle of the scalding channel throughout in the vertical direction downwards and also transversely to the transport direction T, regardless of the fill level of the scalding tank with scalding medium, that is to say both in a "low level" state and in a "high level" state as well as in any intermediate state. The combination of the features of the embodiment according to the invention of the apparatus leads to an improved scalding result with a higher throughput.

A further advantage consists in that, as a result of the scalding medium flowing over the partition walls on both sides and throughout, the fill level of the scalding medium in the scalding tank can be reduced, whereby on the one hand the transport speed of the poultry can be increased without a negative effect. The lower fill level reduces the "braking" effect on the poultry, so that the risk of floating is reduced, while the overflow on both sides ensures that the poultry is nevertheless exposed to scalding medium completely, evenly and throughout. On the other hand, at least a portion of the overflowing scalding medium can be guided through a sieve or the like for filtering the scalding medium.

A particularly preferred embodiment of the apparatus is characterised in that at least two pump devices are arranged along each transport line and each pump device comprises a pump body having a vertically oriented drive shaft with a rotationally driveable turbine and a drive, wherein at least the turbine in the region of the base wall of the or each scalding channel section is arranged inside the scalding tank and the drive is arranged outside the scalding tank. A vertically oriented drive shaft means that the drive shaft is oriented substantially perpendicularly to the base wall. The drive shaft extends, starting from the base wall of the scalding tank, upwards in the direction of the base wall of the scalding channel. On the one hand, a high suction effect is thus ensured over the entire length of each transport line into the deflection region. On the other hand, the positioning of the drives outside the scalding tank ensures that the drives are effectively protected against the ingress of scalding medium. By means of the number and positioning of the pump devices, which is in each case variable, an embodiment is provided which generates in the chamber, beneath the entire scalding channel, an overpressure which is sufficient to draw the scalding medium by suction out of the scalding channel over the entire length and to pump it vertically upwards through the free spaces, past the means for warming the scalding medium, in order that the scalding medium, which is then warmed (again), flows back into the scalding channel from above on both sides. The preferred orientation of the drive shaft of course also applies to embodiments having at least one pump device.

In a preferred embodiment, at least one separate pump device is associated with each linear scalding channel section. In other words, at least one pump device, but preferably two and, depending on the length of the transport line, also more than two pump devices is/are arranged along a transport line. Each of these pump devices acts solely on one transport line. This means in particular that the diameter of the turbine preferably corresponds substantially to the width of the transport line and is associated with only a single transport line in the region of the base wall. The number of pump devices for each transport line depends on the length of the transport line. Depending on the capacity of the pump device, a maximum reach of the turbine of about 3.5 m in diameter is assumed in principle, the distance of the pump devices from one another should be not more than 3.5 m. In the case of a lower capacity, a smaller distance can also be chosen.

In a further, particularly preferred embodiment, at least one common pump device is associated with at least two scalding channel sections running adjacent and parallel to one another. Each pump device is thus preferably arranged centrally between two transport lines in the region of the base wall, so that the turbine is in operative connection with at least two transport lines. In other words, two or more adjacent transport lines are connected to a common pump device. The turbine extends in the base region of the scalding channel sections transversely to the transport direction over portions of at least two transport lines. A plurality of such pump devices can be arranged along the transport lines one behind the other in the transport direction T. With regard to the distances from one another and from the curved scalding channel sections, the comments made hereinbefore apply correspondingly.

At least one row, preferably two rows, of pump devices is/are advantageously configured and arranged transversely to the longitudinal extent of the linear scalding channel sections, wherein the maximum distance of the pump devices from the curved scalding channel sections is about 3.5 m. A row comprises at least two, in other embodiments also three or more, pump devices, which are preferably arranged in a line transversely to the transport direction. The individual pump devices of a row can, however, also be arranged offset relative to one another. The pump devices of a row form a pump unit. A plurality of such pump units is preferably provided. The associated drives for the turbines of each pump device can be arranged on one side or on opposite sides of the pump unit. A belt drive is preferably used for transferring the drive torque to the vertically oriented drive axles. However, other drive concepts can likewise be used.

In a preferred further development, two or more pump devices of a row form a pump unit which, together with centre units with linear scalding channel section portions and end units with linear and curved scalding channel section portions, forms an apparatus of modular construction having the scalding channel throughout. As a result of the modular construction of the apparatus, an adaptation to different conditions can be made in a simple manner. In particular, the simple replacement of one or of each pump unit and/or the addition of pump units is also advantageous, since the apparatus can be adapted, for example, to different lengths and/or different power stages.

A particularly advantageous embodiment is characterised in that adjacent partition walls delimiting a scalding channel section have different heights, such that a partition wall facing the dorsal side of the poultry is lower than an opposite partition wall facing the breast side of the poultry. The different heights of the partition walls apply to both the linear and the curved scalding channel sections, so that this effect can extend over the entire length of the scalding channel. The transport means and the scalding tank are arranged relative to one another and adapted such that the poultry is in effect transported sideways through the scalding channel, so that the dorsal side and the breast side face the two partition walls delimiting the scalding channel. The exposure of the dorsal side and the breast side to different volumes can optionally take place, for example, by targeted pump control. However, the different construction heights of the two partition walls delimiting the scalding channel are particularly simple and effective, so that, with a partition wall of a smaller height, the scalding medium strikes the dorsal side sooner/earlier and with a greater volume than it does the breast side. Targeted action can thus be taken with regard to the fact that the poultry has more feathers and feathers that are more difficult to loosen on the dorsal side than on the breast side, for which reason a more intensive scalding process with a greater scalding volume is sought on the dorsal side than on the breast side.

The partition wall facing the dorsal side is preferably at least one centimetre, optionally also at least two centimetres and further optionally also at least three centimetres lower than the partition wall facing the breast side. With a one-centimetre height difference between the partition walls of a scalding channel section, the total volume flow is divided approximately in the ratio 40:60 (breast side/dorsal side), with a two-centimetre height difference approximately in the ratio 30:70 (breast side/dorsal side) and with a three-centimetre height difference approximately in the ratio 20:80 (breast side/dorsal side).

In a particularly advantageous embodiment, the height of at least one of the partition walls of each scalding channel section is configured so as to be variably adjustable. For example, it is possible that one partition wall, preferably the partition wall facing the dorsal side, is in telescopic form in terms of its height at least in some regions. It is also possible to vary the height difference by means of simple plug-in elements. Further options are formed, for example, by solutions which are adjustable by motor. Regardless of the technical implementation of the adjustability of a partition wall or of both partition walls, individual adaptation of the volumes flowing on the dorsal side or on the breast side, for example in dependence on the size of the poultry to be scalded, is thus achieved in order to improve the scalding result.

A preferred variant of the apparatus is characterised in that at least one of the partition walls of a scalding channel section has, at least on an inner side facing the transport line, a shape which is adapted at least in some regions to the contour of the poultry. In principle, the mutually spaced apart partition walls of a scalding channel section can be planar, for example. The partition walls can be arranged in parallel or converging towards the base wall. Particularly preferably, however, both partition walls are contoured at least on the inwardly facing inner side facing the poultry to be scalded. The course of the contour can vary. A preferred contour provides that the width of the scalding channel is reduced at least in some regions, such that the overflowing scalding medium is guided in the direction towards the poultry, whereby the scalding medium is directed at and strikes the poultry with a greater force and at a higher speed. As a result of this effect, the scalding medium can more efficiently penetrate the stronger tectrices in outer layers in the direction towards the skin, in order to loosen the feathers in the transition region to the skin, whereby the scalding result is improved. It is further possible that only one of the partition walls, preferably the partition wall facing the dorsal side, has a corresponding shaping.

A particularly preferred embodiment is characterised in that, in order to form a counterflow oriented contrary to the transport direction of the poultry, there is arranged in the output region of the poultry from the scalding tank at least one nozzle device for introducing clean, preferably warmed water, while in the input region of the poultry into the scalding tank there is formed at least one outlet for discharging the contaminated water. A so-called "true counterflow" is thus provided. A single nozzle is preferably arranged in the output region, for example in the region of an end wall of the scalding tank, by means of which fresh water is pumped, preferably with adjustable pressure, in the direction towards the input region and in any case contrary to the transport direction of the poultry. The nozzle device can, however, also have a plurality of nozzles in the output region. It is also possible that the nozzle device comprises a plurality of nozzles which are positioned on opposite end walls of the scalding tank, in order to "drive" the counterflow contrary to the transport direction in each transport line. The fresh water accordingly flows against the transport direction at all times, whereby the poultry is at least partially freed of dirt and loose feathers and these contaminants are entrained with the flow in the direction towards the input region. Accordingly, the counterflow becomes increasingly dirtier in the direction towards the input region, while the poultry and also the scalding medium become increasingly cleaner in the direction towards the output region. In order to assist with the flow of the fresh water in the direction towards the input region, the nozzle or any other input means is arranged higher on the scalding tank in the output region than the or each outlet in the input region. In addition to the "cleaning function" of the fresh water supplied as counterflow, the supplied fresh water can also lead to or be used for compensation of the water loss, in particular caused by the fact that the poultry extracts this water during the scalding process by absorption in the plumage.

Since the poultry takes up scalding medium as it is transported along the scalding channel, that is to say some of the scalding water is absorbed by the poultry in particular through the plumage, balancing to compensate for the water loss optionally takes place only via the nozzle device. The water loss that occurs as a result of the discharge of the contaminated water in the input region can in particular also be compensated for thereby. The pump devices arranged along the scalding channel serve primarily and preferably exclusively for circulating the scalding medium internally within the scalding tank and preferably do not affect the amount of water in the scalding tank. Ultimately, the water circulation which circulates within the pressure chamber is thus in effect uncoupled, or isolated, from the "true counterflow".

As mentioned, a pump device can be associated exclusively with a transport line, or a scalding channel section. To this end, a turbine of each pump device is advantageously arranged in a region of a breakthrough of the base wall of the scalding channel section in order to establish a flow connection between the scalding channel section and the receiving compartment, wherein the turbine is shielded at least partially with respect to the scalding channel section by a cover which is arranged and formed spaced apart from the turbine. The cover can be a grid. However, the cover can also be a ramp-like cap or the like which extends preferably over the entire width of the scalding channel and is closed in the transport direction, starting from the base wall, and runs obliquely upwards, while on the opposite side of the cover in the transport direction there is formed an opening via which the flow connection with the receiving compartment is established. However, other configurations and arrangements are of course possible.

In other embodiments, the or each pump device, as described above, serves at least two transport lines, or scalding channel sections. To this end, a turbine of each pump device is preferably arranged in a region of a breakthrough of a base wall and/or partition wall of at least two scalding channel sections in order to establish a flow connection between at least two adjacent scalding channel sections and the receiving compartment, wherein the turbine is shielded completely with respect to the free space formed between adjacent partition walls of adjacent scalding channel sections. A preferred embodiment establishes the connection between the scalding channel section and the receiving compartment by partial breakthroughs in the respective base wall and partial breakthroughs in the two partition walls delimiting the free space. The free space itself is closed with respect to the turbine and thus the pump device by a cap or the like, such that the cap has three wall sections which each extend from partition wall to partition wall. In the region of these caps, pumping of the scalding medium vertically upwards is effectively prevented. In front of and behind the caps in the transport direction, pumping of the scalding medium vertically upwards is possible. Overflowing of the partition walls on both sides is thus ensured throughout, even in the region in which the turbines are arranged. However, other configurations and arrangements are of course also possible. It is possible inter alia that the free space in the region of the pump device is interrupted, or omitted, such that wall portions that are oriented transversely to the transport direction extend from partition wall to partition wall and thereby close the free space and shield it with respect to the turbine over the entire height of the partition walls.

In an advantageous further development, there is arranged along the scalding channel at least one turbulence-generating body as the means for generating turbulence and/or flow of the scalding medium, which turbulence-generating body can be driven in rotation by means of a drive shaft which is oriented horizontally and is oriented transversely to the transport direction T of the poultry. The turbulence-generating body preferably comprises an impeller, propeller or the like. There is particularly preferably provided as the turbulence-generating body a vortex water turbine, which has a very high pumping capacity at a low speed (e.g. 300 rpm) and thus ensures energy-efficient generation of the turbulence and/or flow to assist with the pumping capacity of the pump device. The above-described advantages can thus be further assisted, in particular when the vortex water turbine is arranged in the region of the deflections.

At least one closable opening for access to the pressure chamber is advantageously formed in the region of the side walls of the scalding tank, preferably in the region of the input region at external transport lines. By way of example, closable doors, flaps or the like can be provided, which, in addition to allowing access to the scalding tank from above, allow access to the scalding tank, or directly to the pressure chamber, in the region of the base wall. Such a cleaning flap is particularly preferably arranged in the input region.

At least one outlet valve is expediently associated with the scalding tank. The or each outlet valve is preferably arranged in the input region. However, the number of outlet valves and the positioning thereof can vary.

A control device at least for controlling and/or regulating the means for warming the scalding medium is advantageously associated with the apparatus. However, there can optionally also be connected to the control device, for example, a means for determining the fill level of the scalding medium within the scalding tank and/or the or each outlet valve. Further connections of the control device and the integration thereof into a network are likewise possible.

The object is also achieved by a method having the steps mentioned hereinbefore in that the scalding medium, by means of at least one pump device, is drawn by suction out of the scalding channel from beneath and pumped back into the scalding channel from above on both sides thereof over the entire length of the scalding channel, that is to say in the region of the linear and of the curved scalding channel sections.

The poultry is preferably transported sideways through the scalding channel delimited by mutually opposite partition walls, such that the poultry, as it is transported, is oriented with a dorsal side facing one partition wall and with a breast side facing the opposite partition wall, wherein a larger volume of scalding medium is fed back into the scalding channel from above over the partition wall facing the dorsal side than over the partition wall facing the breast side.

Advantageously, fresh water is supplied, starting from the output region in the direction towards the input region, in order to generate a counterflow contrary to the transport direction T of the poultry, so that the poultry is transported against the flow of the fresh water and contaminated scalding medium collects in the input region and the poultry is transported in the direction towards the output region through increasingly clean scalding medium.

As the poultry is transported through the scalding channel, it is optionally immersed in the scalding medium either completely, partially or not at all. When the poultry is not immersed in the scalding medium at all, the fill level "low level" is present. If the poultry is immersed completely in the scalding medium (preferably except for the feet/legs), the fill level "high level" is present. Any fill level between "low level" and "high level" can be realised, wherein the resistance generated by the scalding medium to the poultry during transport thereof through the scalding channel falls as the fill level falls and is eliminated in the case of the "low level".

The scalding medium is expediently cleaned by means of a filter device. Cleaning can take place while the apparatus is operating and/or during a break in operation.

A preferred further development is characterised in that the scalding medium itself circulates within the scalding tank, namely is drawn by suction out of the scalding channel and fed back into the scalding channel as an overflow on both sides, and prewarmed fresh water is pumped under pressure into the scalding channel in the output region contrary to the transport direction T.

Advantageously, the scalding medium, by means of a plurality of pump devices, is drawn by suction out of the scalding channel in the region of base walls and pumped upwards on both sides of the scalding channel, so that it flows back into the scalding channel from above on both sides, wherein at least one pump device serves either one scalding channel section or at least two scalding channel sections.

The method is particularly preferably carried out with an apparatus as disclosed herein.

The advantages which follow from the method according to the invention have already been described in detail in connection with the apparatus, so that, in order to avoid repetition, reference is made to the corresponding passages.

BRIEF DESCRIPTION OF THE DRAWINGS

Further expedient and/or advantageous features and further developments relating to the apparatus and corresponding steps relating to the method will become apparent from the description. Particularly preferred embodiments of the apparatus and the method will be explained in greater detail with reference to the accompanying drawing, in which.

Figure 1:
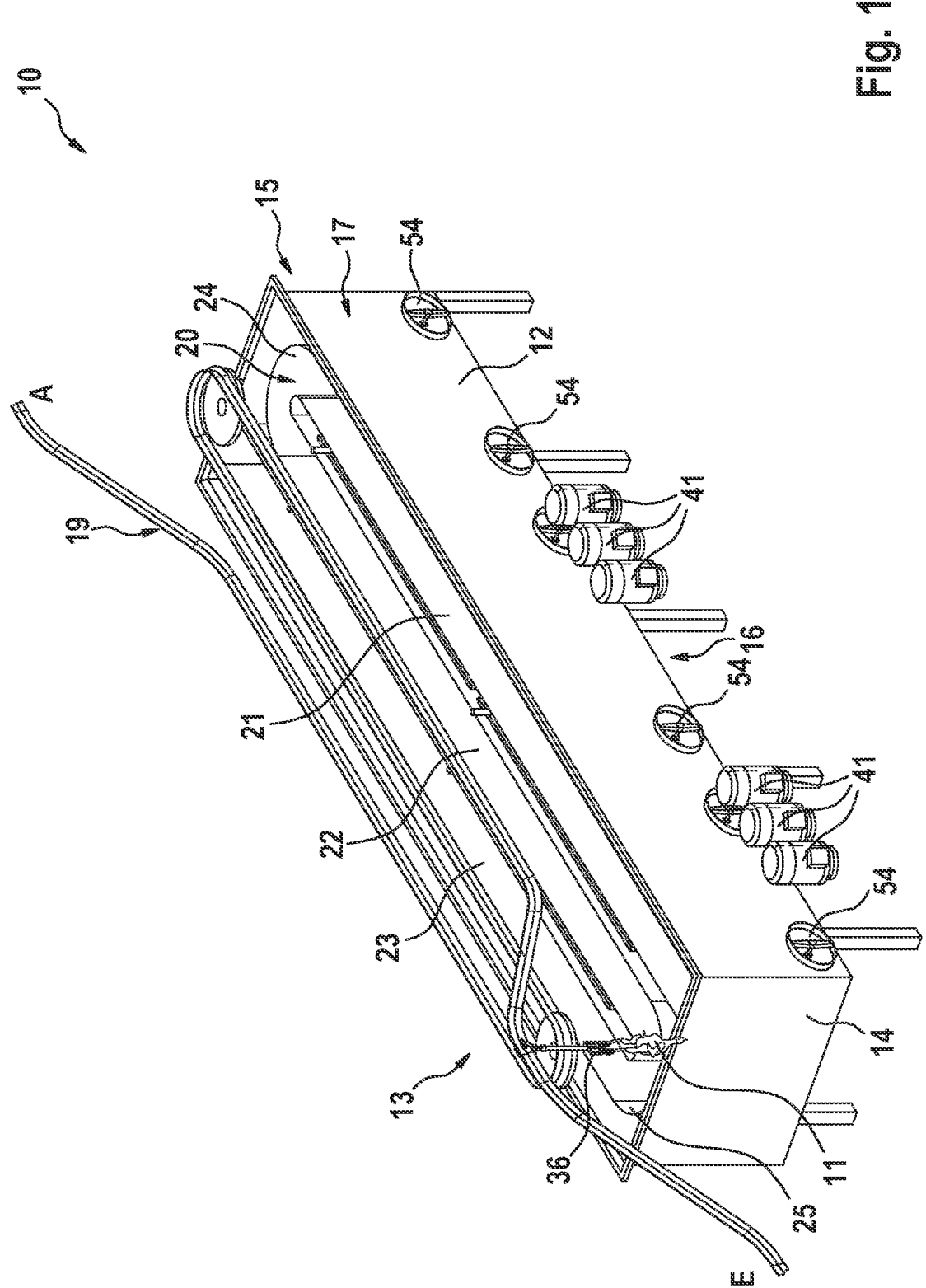
FIG. 1 is a perspective view, in schematic form, of an apparatus according to the invention without a covering cap.
Figure 2:
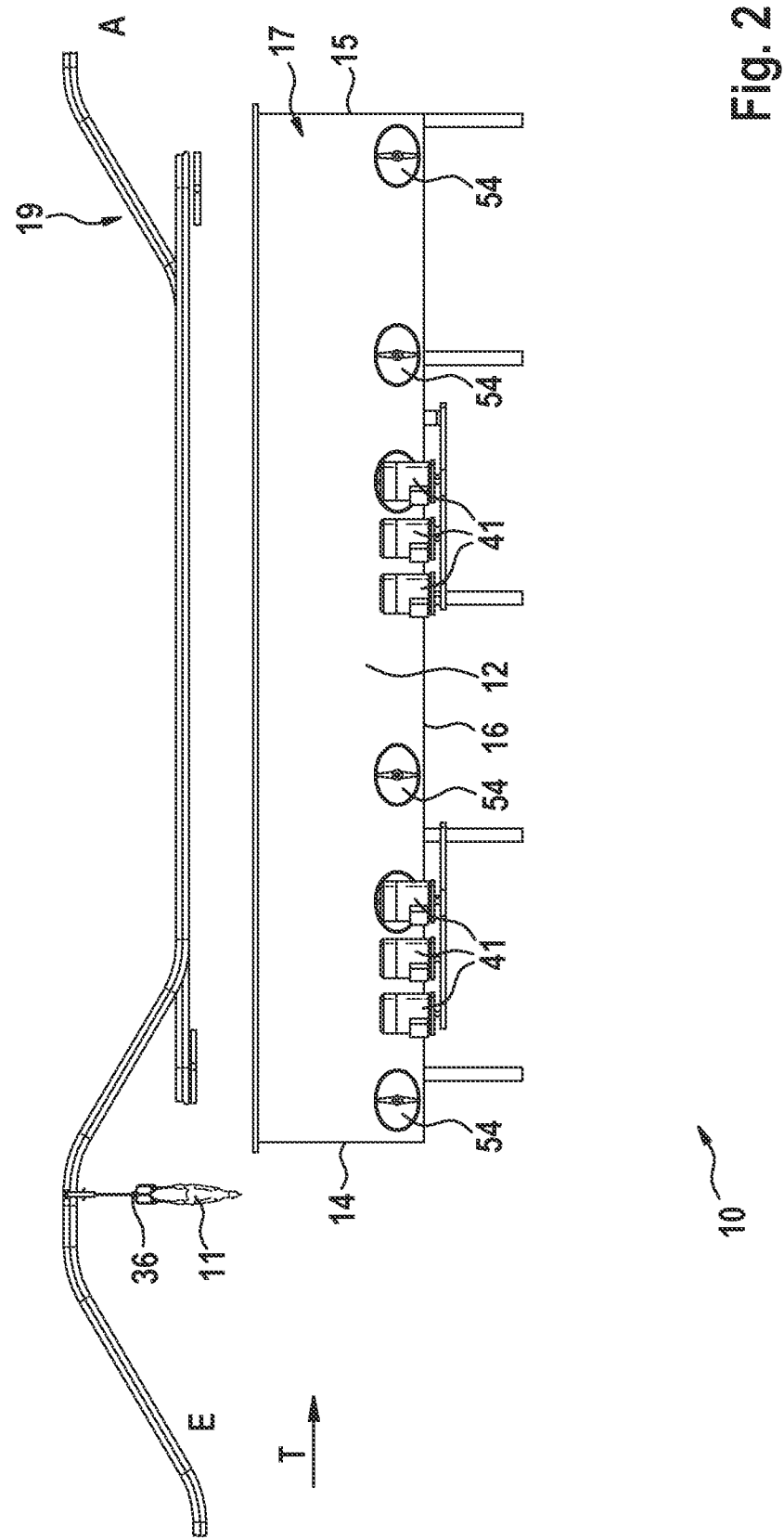
FIG. 2 is a side view of the apparatus according to FIG. 1.
Figure 3:
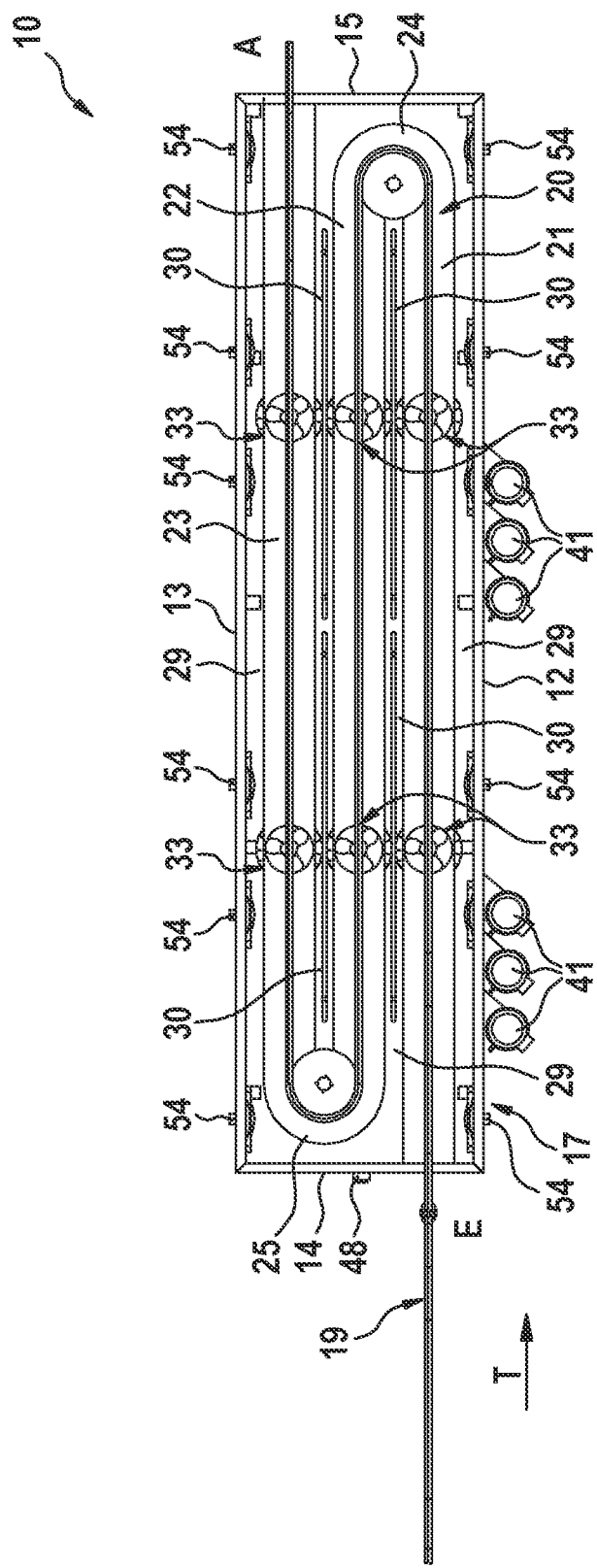
FIG. 3 is a top view of the apparatus according to FIG. 1.
Figure 4:
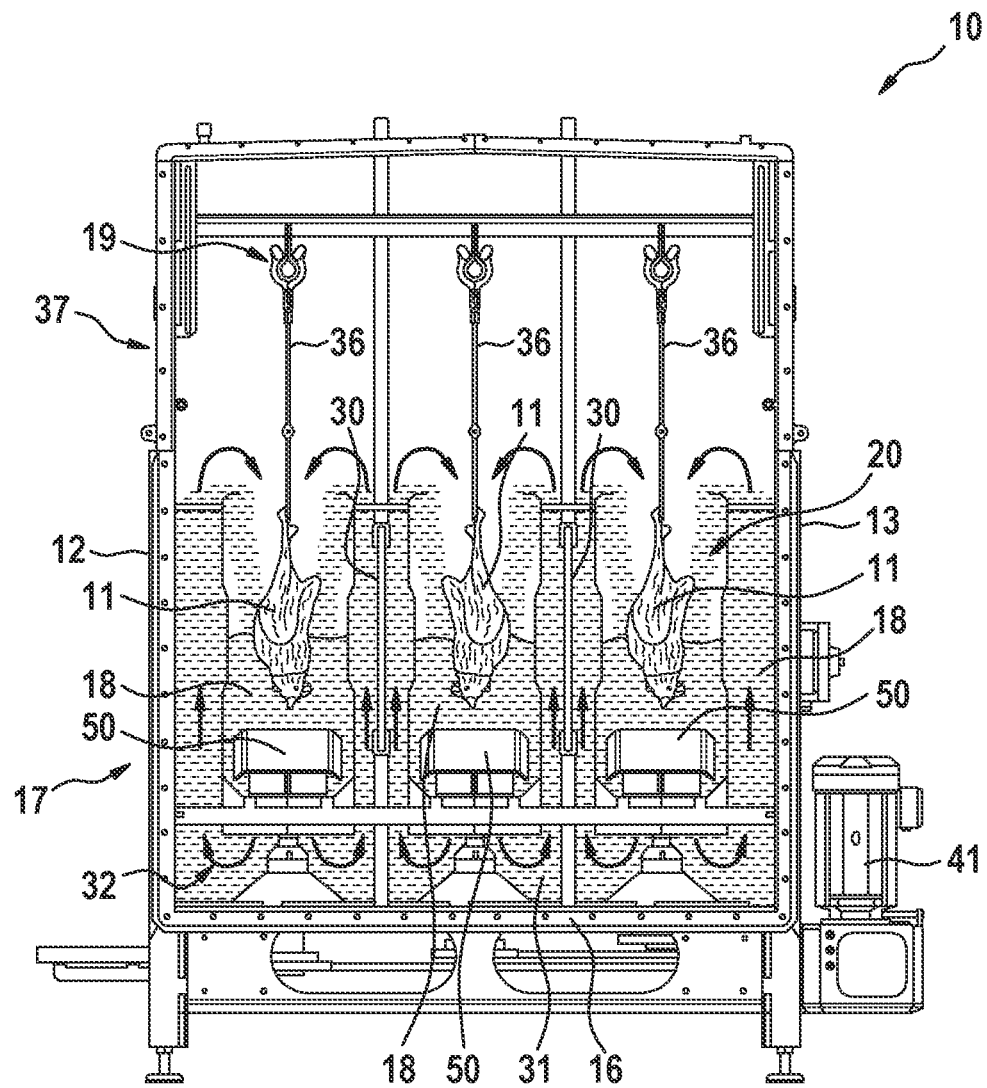
FIG. 4 is a front view of the apparatus according to FIG. 1 with a covering cap in a first sectional representation.
Figure 5:
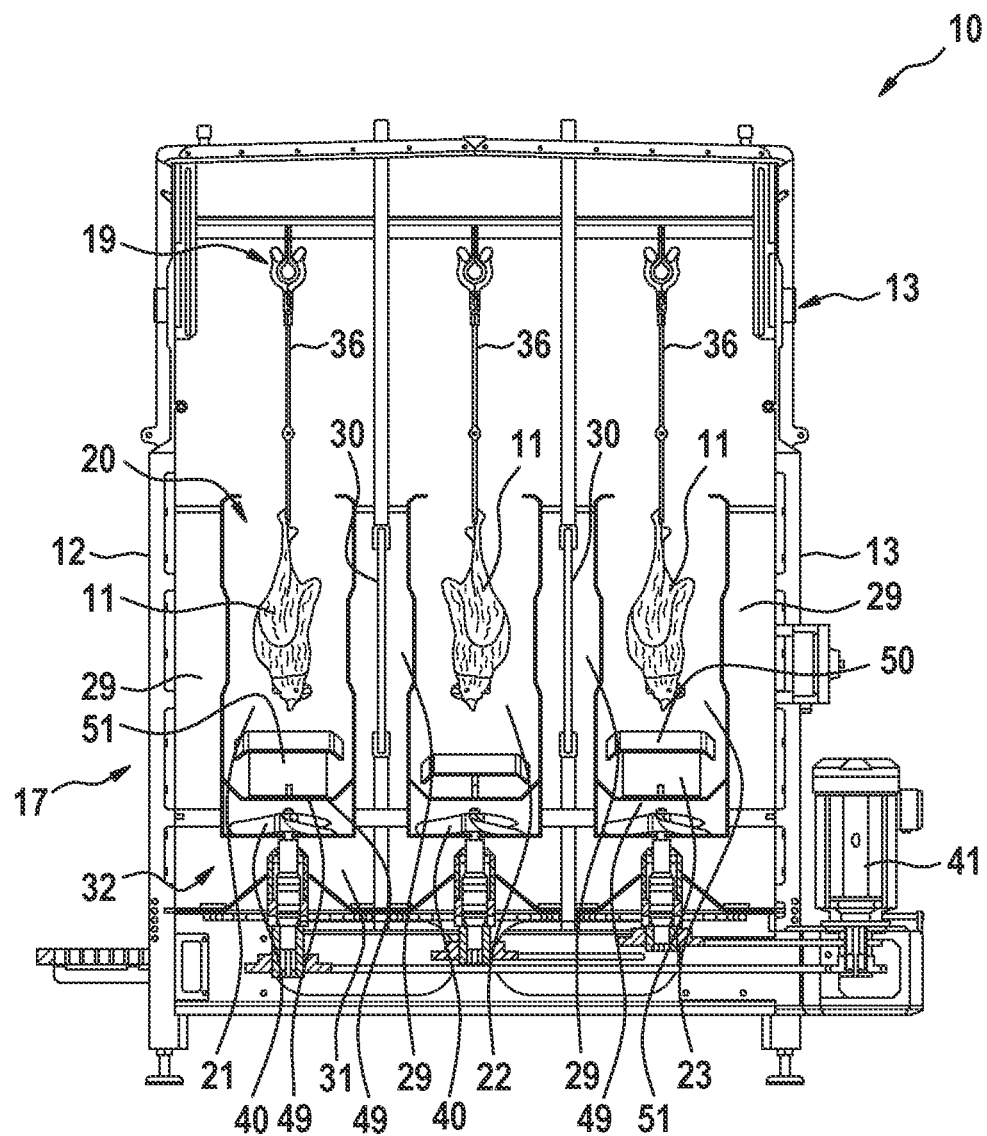
FIG. 5 is a front view of the apparatus according to FIG. 1 with a covering cap in a further sectional representation.

The apparatus shown in the drawing serves for the scalding of chickens which are hanging upside down and are transported within the scalding tank through a scalding medium, namely in such a manner that the chickens are at least partially beneath the surface of the scalding medium, so that the chickens are exposed to the scalding medium in the transport lines and additionally to the scalding medium flowing out of the channel at the ends and at the top. The level of the scalding medium can of course also be lower, such that the chickens are not immersed in the scalding medium at all, so that the chickens are exposed only to the scalding medium flowing into the scalding channel from above, or also higher, such that the chickens are immersed completely in the scalding medium, so that the chickens are exposed both to the scalding medium in the transport lines and to the scalding medium flowing into the scalding channel from above. The invention is correspondingly usable also for turkeys, ducks, geese and other fowl and waterfowl.

The apparatus 10 is configured and adapted for scalding slaughtered poultry 11 and comprises an elongate scalding tank 17, which is closed on all sides by side walls 12, 13 and end walls 14, 15 and at the bottom by a base wall 16 and which is open at the top, for receiving and for holding a liquid scalding medium 18, and a transport means 19, arranged above the scalding tank 17, for transporting the poultry 11 in a hanging manner within the scalding tank 17 along a scalding channel 20 formed of a plurality of scalding channel sections from an input region E to an output region A, wherein at least two transport lines 21, 22, 23 for the poultry 11 are formed within the scalding tank 17, in each case from one end of the scalding tank 17 to the opposite end of the scalding tank 17, and the transport lines 21 to 23 are connected to one another by means of curved connecting lines 24, 25 for 180-degree deflection, wherein each transport line 21 to 23 and each connecting line 24, 25 is delimited by two partition walls 26, 27, which are arranged spaced apart from one another transversely to the transport direction, and a base wall 28 to form linear scalding channel sections which are open at the top and curved scalding channel sections which are open at the top, wherein partition walls 26, 27 of adjacent scalding channel sections and partition walls 26, 27 that are situated adjacent to outside walls of the scalding tank are arranged spaced apart from one another to form a free space 29 for the scalding medium 18, wherein means 30 for supplying and/or warming the scalding medium 18 are associated at least with the free spaces 29 of adjacent scalding channel sections, and wherein there is formed beneath at least parts of the scalding channel 20, namely at least between the base walls 28 of the linear scalding channel sections and the base wall 16 of the scalding tank 17, a receiving compartment 31 for scalding medium 18 which, together with the free spaces 29, forms a common chamber 32 with which there is associated at least one turbulence-generating body 33 for generating turbulence and/or flow of the scalding medium 18 in the scalding tank 17.

DETAILED DESCRIPTION OF THE INVENTION

According to the invention, this apparatus 10 is distinguished in that the receiving compartment 31 extends beneath the entire scalding channel 20, that is to say between the base walls 28 of the linear and of the curved scalding channel sections on the one hand and the base wall 16 of the scalding tank 17 on the other hand, wherein there is arranged in the receiving compartment 31, which as a result extends into the region of the curved scalding channel sections, at least one pump device 34 as a turbulence-generating body 33 for forming a pressure chamber 35 which acts along the entire scalding channel 20.

The features and further developments described hereinbelow represent preferred embodiments when considered on their own and in combination with one another. It is expressly pointed out that features which are combined in the description and/or the drawing or are described in a common embodiment can also develop further the above-described apparatus 10 functionally independently.

The scalding tank 17 is a trough-like body which is delimited at the bottom by the base wall 16 and at the sides/outside by the side walls 12, 13 and the end walls 14, 15. The scalding tank 17 extends in the longitudinal direction in the transport direction T of the transport means 19. The end walls 14, 15, which are significantly shorter than the side walls 12, 13, delimit the scalding tank 17 in order to form the receiving volume for the scalding medium 18, so that the scalding medium can be received and held, that is to say stored. The scalding medium 18 can be water or another fluid, for example water enriched with at least one additive, or the like. The base wall 16 can be configured so as to be horizontal and planar, V-shaped or with a different shape. The scalding tank 17 can be in one piece or in modular or segment-like form and, in the variant shown, has an overall length of preferably about 8-10 m. However, the dimensions of the scalding tank 17 can vary.

In the apparatus 10 shown in the drawing there are formed in the scalding tank 17 three transport lines 21 to 23 which run in parallel and are separated from one another at least partially in their longitudinal extent by partition walls 26, 27. The input region E and the output region A are arranged on opposite sides of the scalding tank 17. In particular where there is an even number of transport lines 21 to 23, the input region E and the output region A can also be arranged on the same side of the scalding tank 17. In the preferred embodiment, the transport means 19 is a suspended conveyor in the form of an upside-down conveyor in which the poultry 11 is conveyed along the transport lines 21 to 23 in a hanging manner with its feet in shackles 36. The suspended conveyor, or the conveyor rail thereof, is on the one hand guided in a meandering manner parallel to the base wall 16 of the scalding tank 17, such that the conveyor rail is deflected through 180 degrees at the end walls 14, 15 of the scalding tank 17 in order to allow the poultry 11 to change from one transport line 21 or 22 to the other transport line 22 or 23. In the input region E and in the output region A, the conveyor rail is adapted in terms of its profile perpendicularly to the base wall 16, in order on the one hand to lift the poultry 11 over the free edges of the end walls 14, 15 of the scalding tank 17 and on the other hand to lower the poultry 11 into the scalding channel 20 within the scalding tank 17 and vice versa. The scalding tank 17 can optionally have a covering cap 37, which substantially also encloses the transport means 19. In order to avoid collisions of the transport means 19 with the covering cap 37, an opening is provided in the covering cap 37 in each of the input region E and the output region A, through which opening the conveyor rail is able to enter and leave the scalding tank 17.

By means of the means 30 for supplying and/or warming scalding medium 18, steam or hot water can optionally be supplied to the scalding tank 17. However, the means 30 is primarily configured for warming scalding medium 18 that flows vertically upwards in the free spaces 29 in the direction of the free edges of the partition walls 26, 27. The means 30 can be a simple heat exchanger. However, other heating means or heating elements can likewise be used. Because the means 30 are arranged in the free spaces 29 in such a manner that they are shielded with respect to the transport lines 21 to 23 of the scalding channel 20, the poultry 11 is protected from direct heat radiation.

Figure 6:
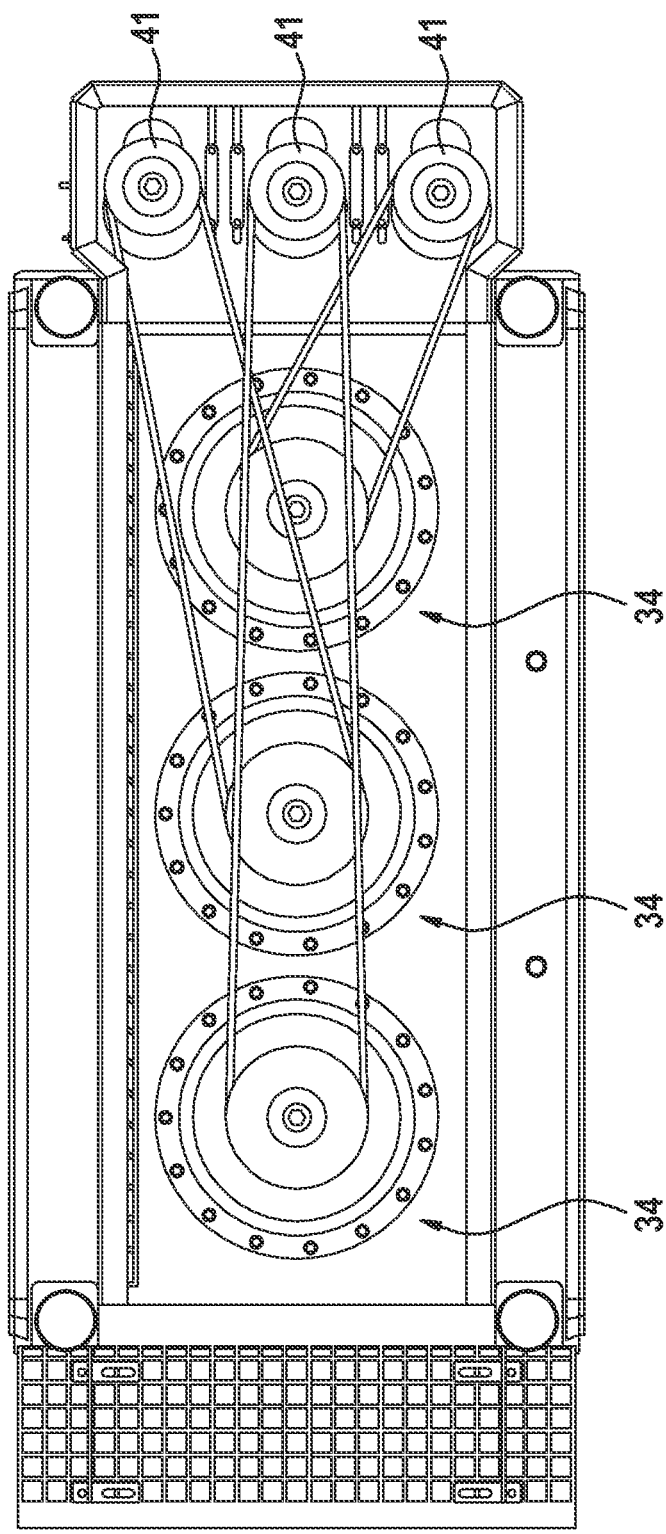
FIG. 6 is a bottom view of a first embodiment of a pump unit of the apparatus according to FIG. 3.
Figure 7:
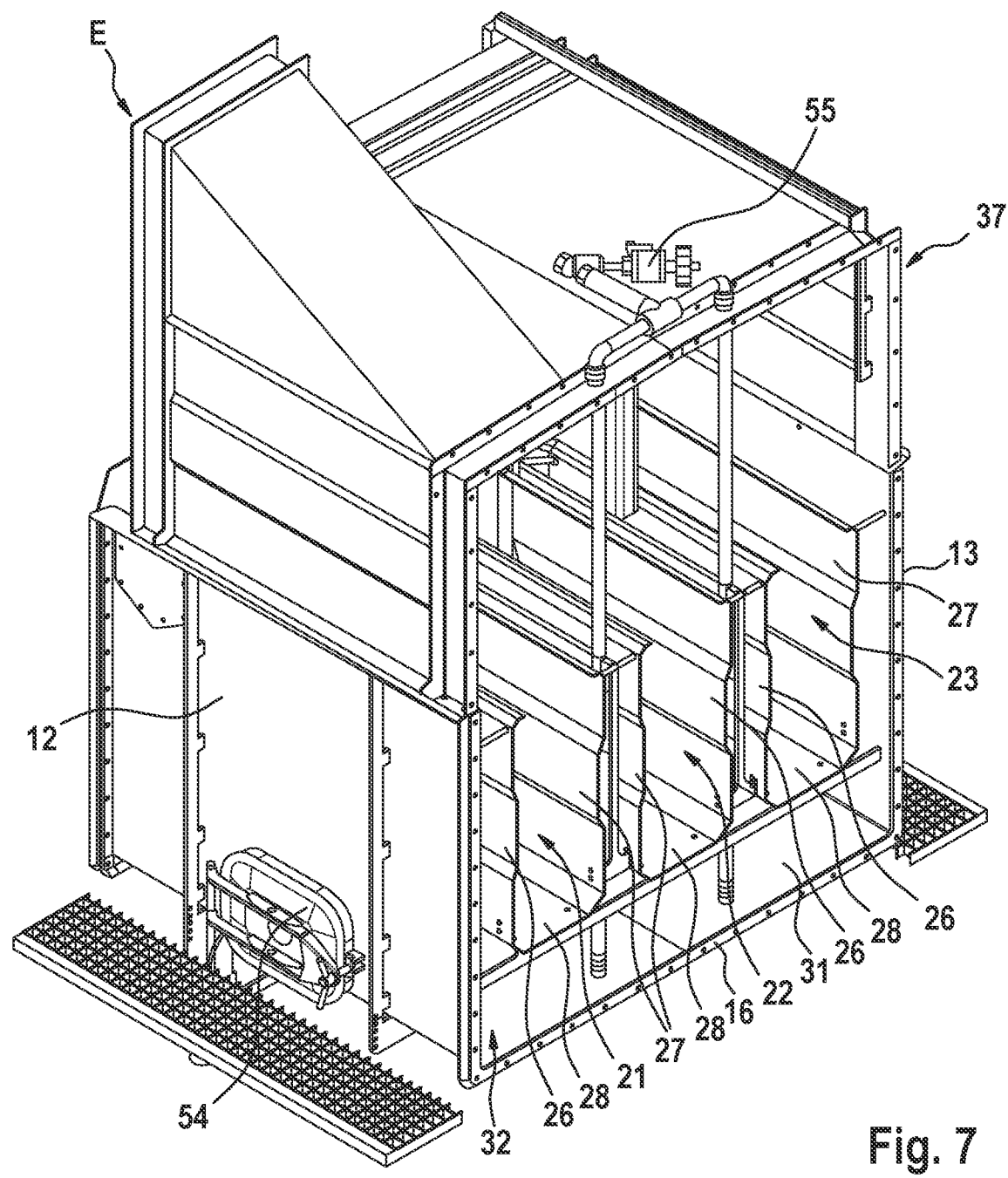
FIG. 7 is a perspective view of an end unit of the apparatus according to FIG. 1 with a covering cap.
Figure 8:
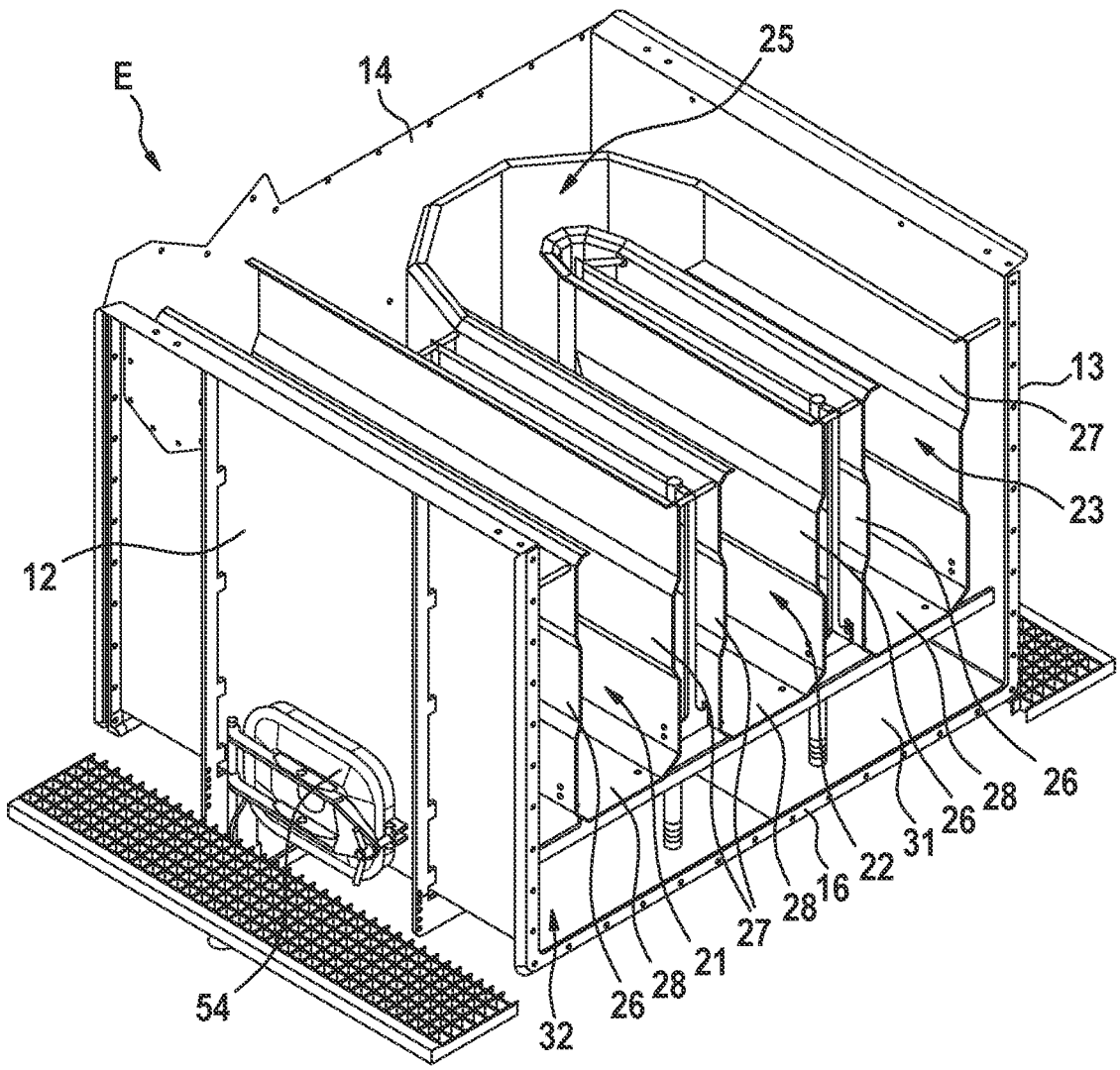
FIG. 8 shows the end unit according to FIG. 7 without a covering cap.
Figure 9:
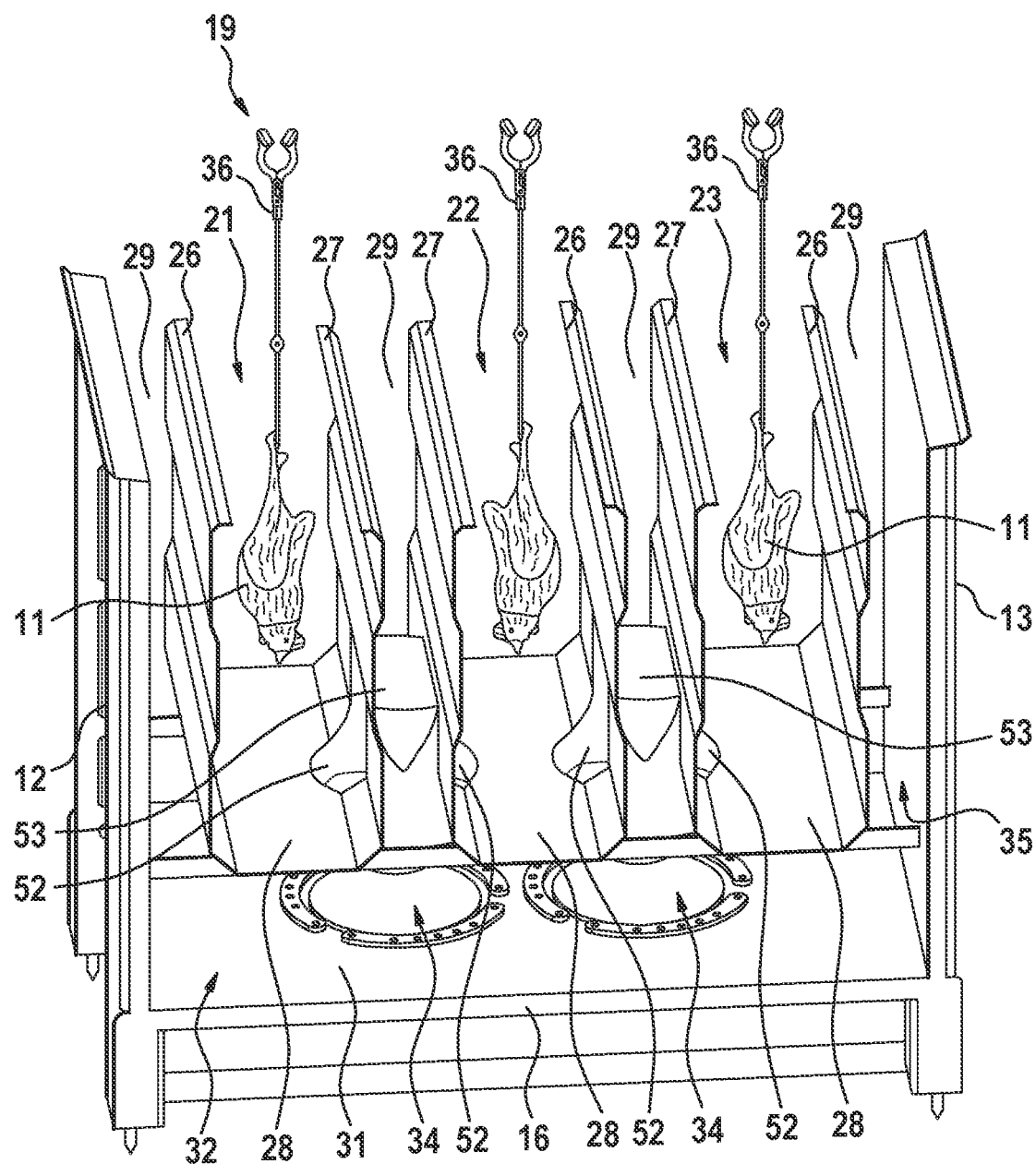
FIG. 9—is a perspective view, obliquely from the front and the top, of a further embodiment of a pump unit.
Figure 10:
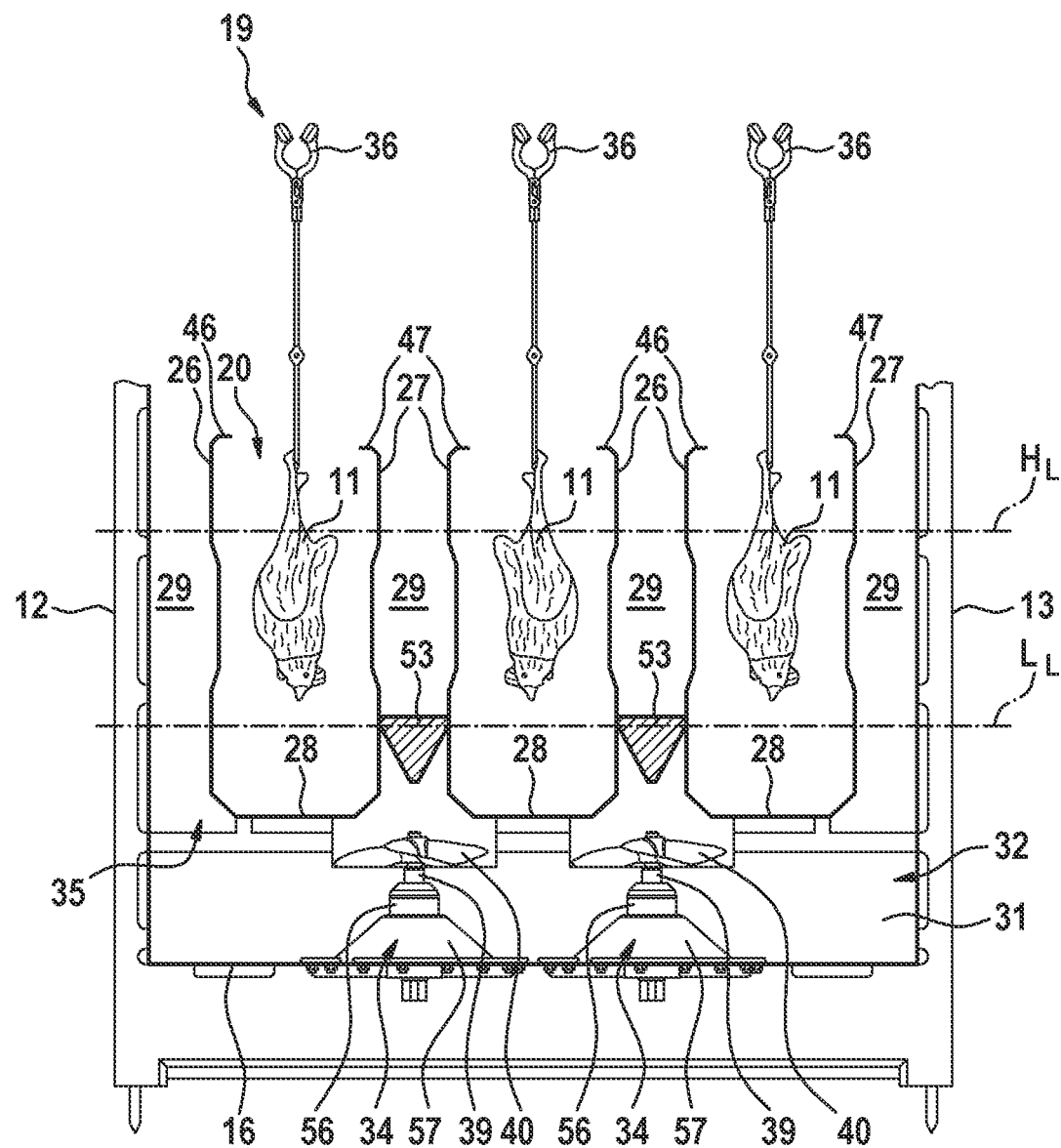
FIG. 10 is a front view of the pump unit according to FIG. 9.
Figure 11:
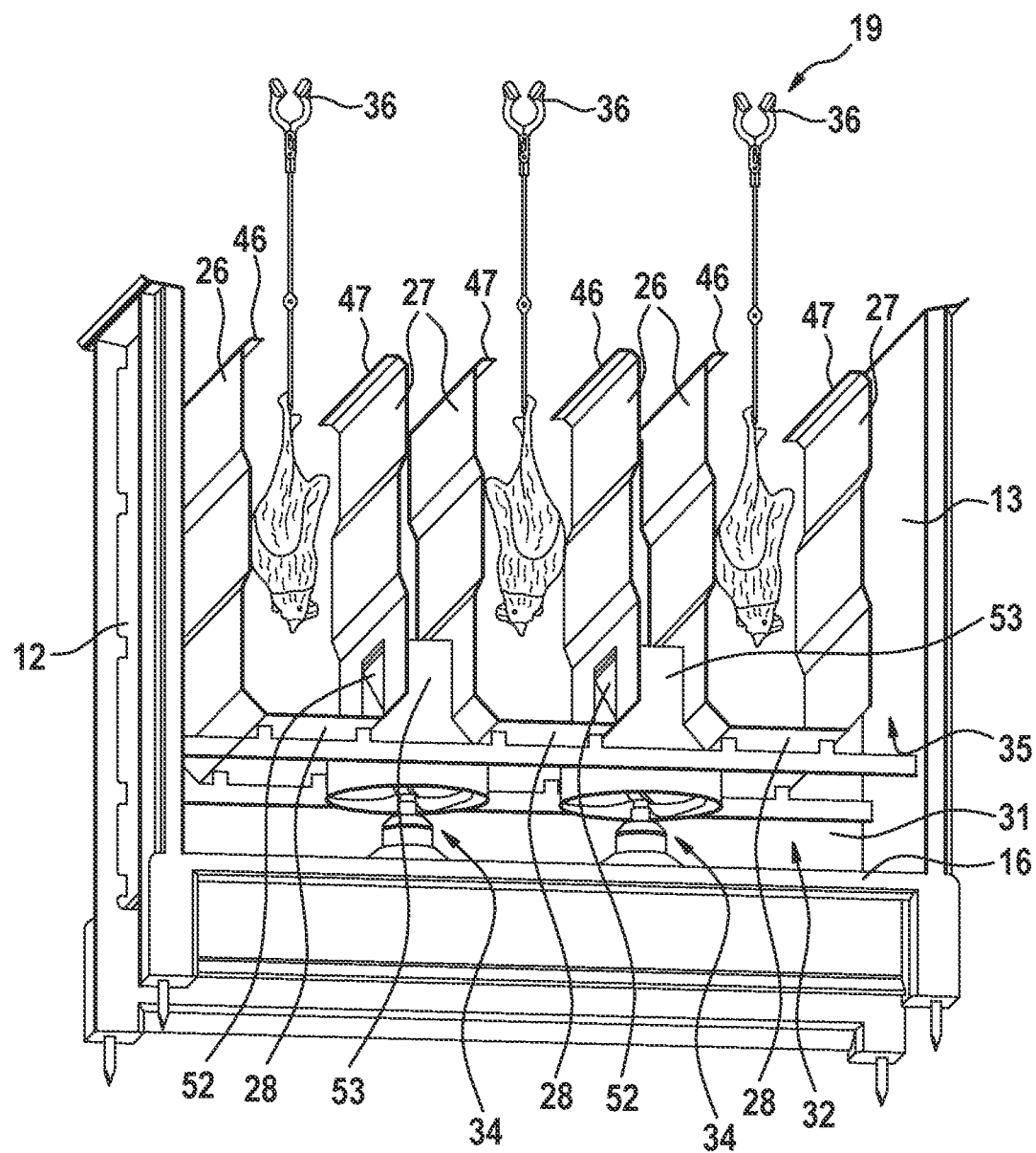
FIG. 11 is a perspective view, obliquely from the front and beneath, of the pump unit according to FIG. 9.
Figure 12:
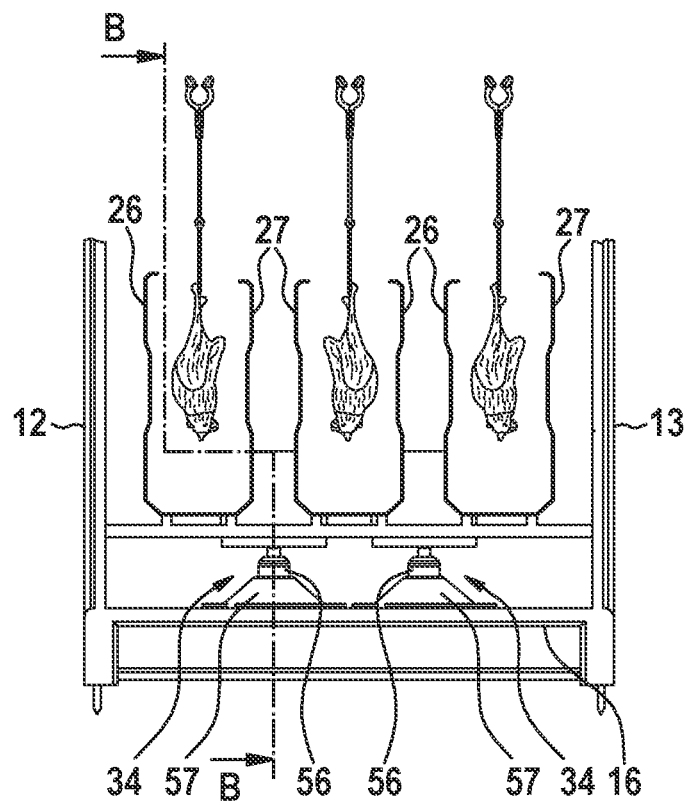
FIG. 12 is a front view of a further embodiment of the pump unit.
Figure 13:
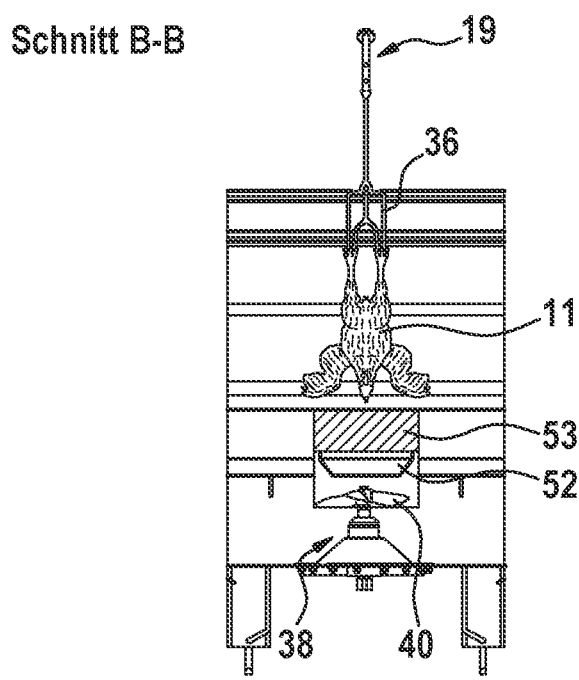
FIG. 13 shows the pump unit along section B-B according to FIG. 12.
Figure 14:
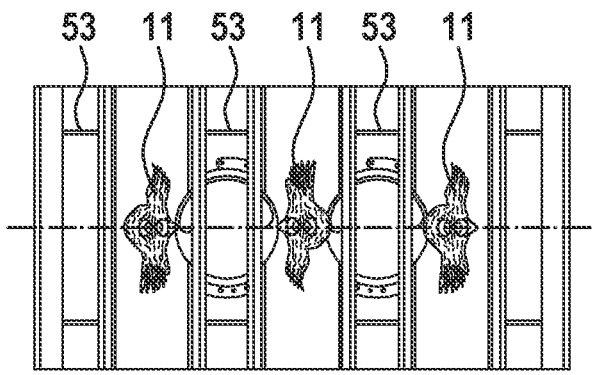
FIG. 14 is a top view of the pump unit according to FIG. 12.
Figure 15:
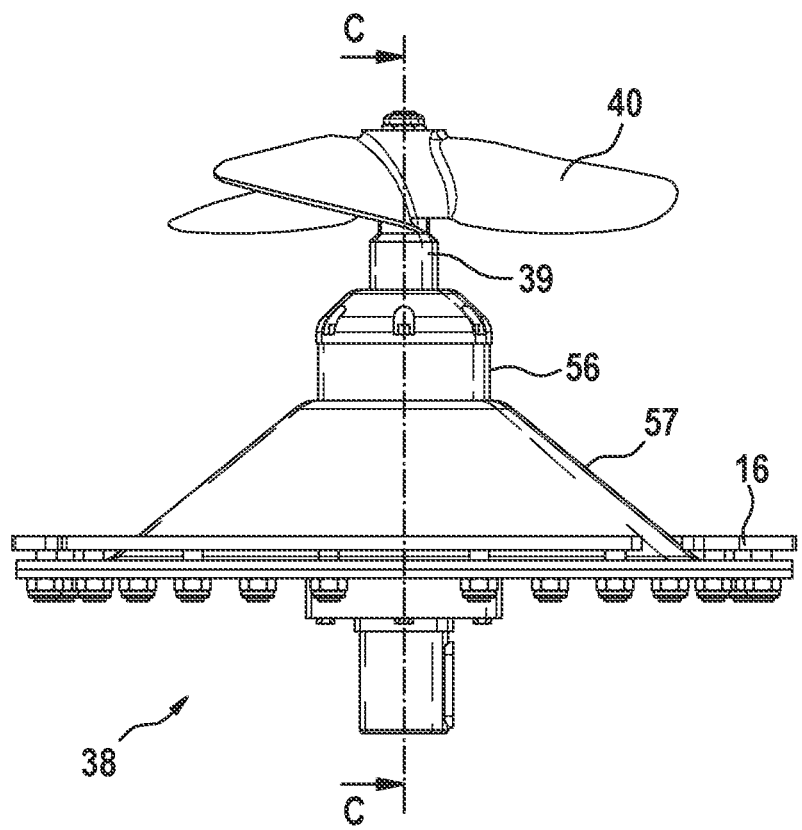
FIG. 15 is a side view, in enlarged form, of a pump device.
Figure 16:
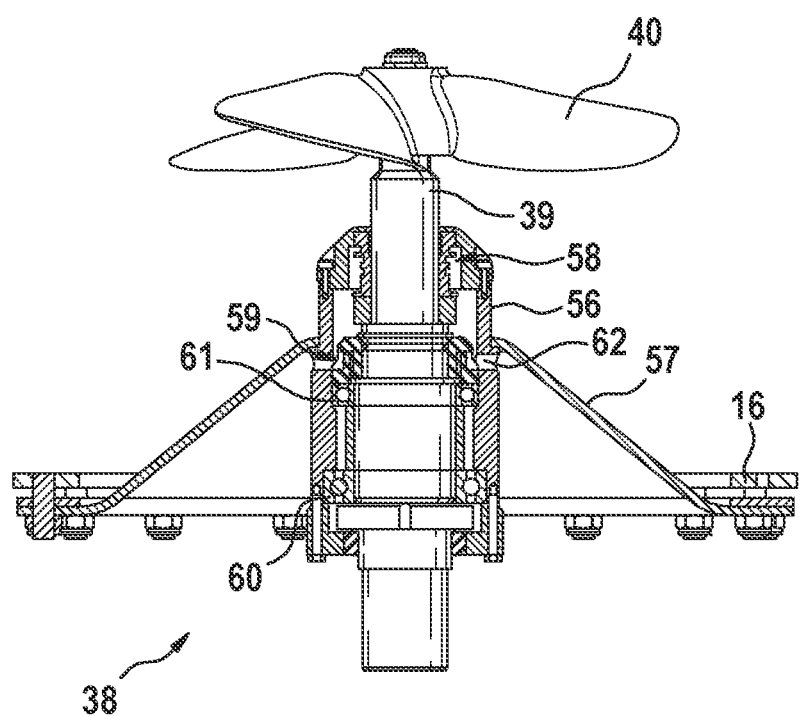
FIG. 16 is a sectional representation of the pump device along section C-C according to FIG. 15.

Along each transport line 21 to 23 there are arranged at least two pump devices 34, and each pump device 34 comprises a pump body 38 having a vertically oriented drive shaft 39 with a rotationally driveable turbine 40 and a drive 41, wherein at least the turbine 40 in the region of the base wall 28 of the or each scalding channel section is arranged inside the scalding tank 17 and the drive 41 is arranged outside the scalding tank 17. In the present exemplary embodiment, the vertical orientation of the drive shaft 39 means perpendicularly to the base wall 16 of the scalding tank 17. The turbine 40 can be in the form of, for example, an impeller or propeller. A detailed description of the pump device 34 follows hereinbelow. Each pump device 34 preferably comprises its own drive 41. However, it is also possible that two or more pump devices 34 use a common drive 41. The transfer of the drive torque from the drive 41 to the drive shaft 39 is achieved in the illustrated embodiment via belt drives (see e.g. FIG. 6). However, other conventional drive concepts can likewise be used.

At least one separate pump device 34 is preferably associated with each linear scalding channel section. In other words, each transport line 21 to 23 has at least one pump device 34. In the example according to FIGS. 3 to 6, two pump devices 34 are associated with each of the three transport lines 21 to 23. Each pump device 34 acts on only one transport line 21 to 23. This means that the suction and pumping action of each pump device 34 is limited substantially to a single transport line 21 to 23. To this end, the turbine 40 is located centrally beneath the base wall 28 of the scalding channel 20. The number of pump devices 34 can in principle vary and can also be different between the individual transport lines 21 to 23. However, the pump devices 34 of adjacent transport lines 21 to 23 are preferably arranged side by side transversely to the transport direction T.

In a further preferred embodiment (see e.g. FIGS. 9 to 14), at least one common pump device 34 is associated with at least two scalding channel sections running adjacent and parallel to one another. Each pump device 34 acts on two transport lines 21, 22 or 22, 23. This means that a pump device 34 draws scalding medium 18 by suction out of two transport lines 21, 22 or 22, 23 and pumps it back via free spaces 29 into two adjacent transport lines 21, 22 or 22, 23 of the scalding channel 20 in that the turbine 40 is arranged centrally between two transport lines 21, 22 or 22, 23, that is to say substantially centrally beneath a free space 29 separating the two transport lines 21, 22 or 22, 23 from one another. It is further possible that one pump device 34 is associated with three or more transport lines 21 to 23.

Figure 17:
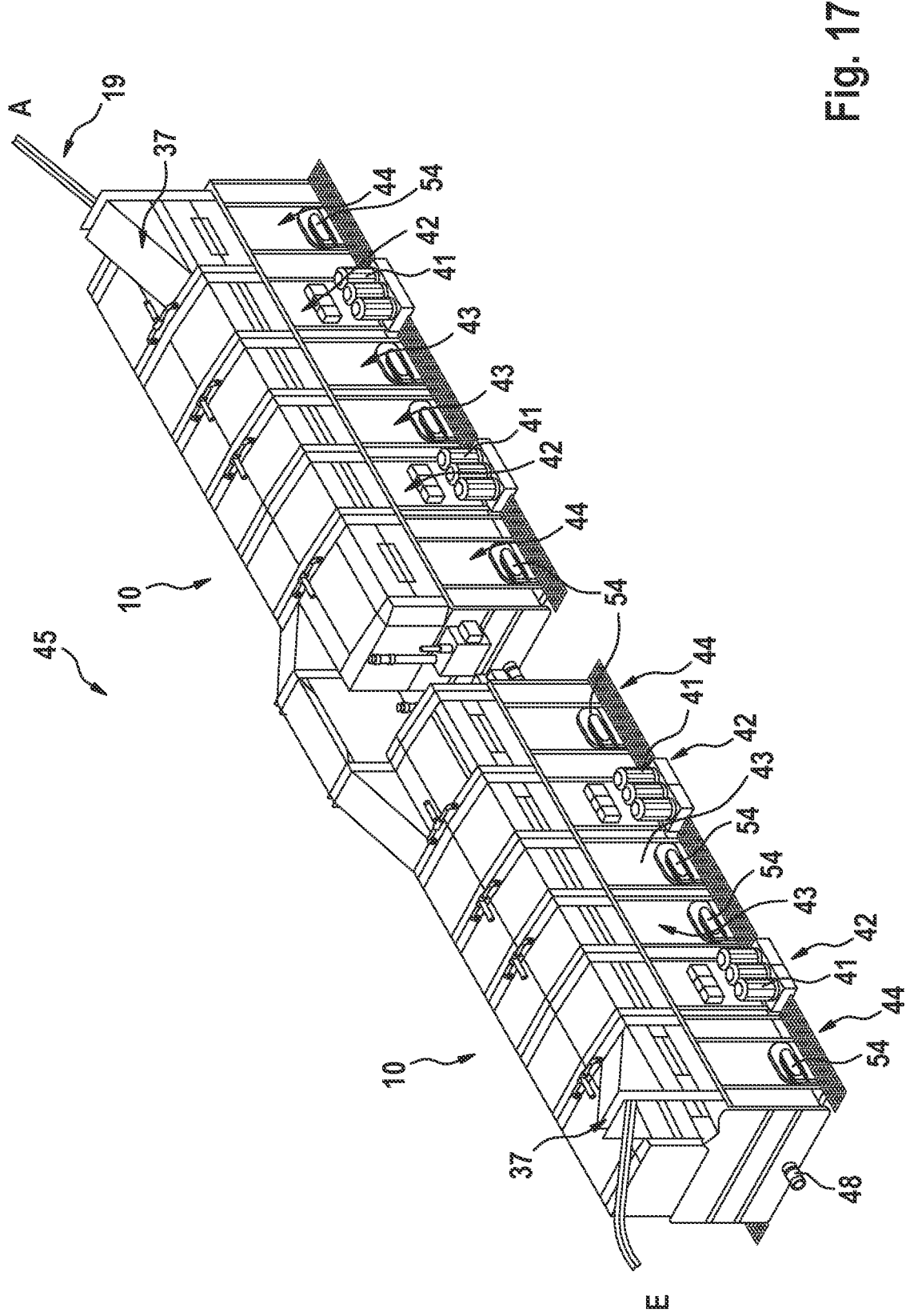
FIG. 17 is a perspective view, in schematic form, of two connected scalding apparatuses of modular construction.

At least one row, preferably two rows, of pump devices 34 is/are preferably formed and arranged transversely to the longitudinal extent of the linear scalding channel sections, wherein the maximum distance of the pump devices 34 from the curved scalding channel sections is about 3.5 m. Irrespective of the association of a pump device 34 with a single transport line 21, 22, 23 or with two or more transport lines 21 to 23, a row formation of the pump devices 34 to form a pump unit 42 is preferred. The drives 41 of the pump devices 34 can be arranged on one side or on both sides of the pump unit 42. Such a pump unit 42 forms, together with centre units 43 with linear scalding channel section portions and end units 44 with linear scalding channel section portions and curved scalding channel section portions, an apparatus 10 of modular construction having the scalding channel 20 throughout. Such an apparatus 10 formed of the units 42, 43, 44 can be used as a single scalding apparatus. However, two or more such single scalding apparatuses can optionally also be connected together to form a scalding line 45 (see e.g. FIG. 17). The number of units 42 to 44 can be variable and individually adapted. As described hereinbefore, the maximum distance of the pump devices 34 not only from the curved scalding channel sections, that is to say from the curved connecting lines 24, 25, in the redirection region, but also between the individual pump devices 34 in the transport direction T should be 3.5 m, in order to provide a sufficient suction and pumping capacity over the entire length of the scalding channel 20 in all regions of the scalding tank 17. The distance can of course be reduced. Depending on the pumping capacity, a larger distance of the pump devices 34 from one another and/or from the curved connecting lines 24, 25 is in principle possible.

The partition walls 26, 27 which delimit the scalding channel 20 at the sides in each transport line 21 to 23 and each connecting line 24, 25 have free edges at the open end of the scalding channel 20, at which free edges there are preferably arranged guiding elements 46, 47 for the directed guiding of the scalding medium 18 as it flows over the partition walls 26, 27 on both sides into the scalding channel 20. The form of the guiding elements 46, 47 is variable. In the embodiment shown, the guiding elements 46, 47 are shaped in such a manner that the scalding medium 18 flows over into the scalding channel 20 substantially transversely to the transport direction T of the poultry 11. In other embodiments, the guiding elements 46, 47 can also be shaped and/or oriented differently, for example in such a manner that the overflowing scalding medium 18 is directed into the scalding channel substantially in the transport direction T, in particular in the case where the transport speed of the poultry 11 is particularly high, in order additionally to push the poultry 11 in the transport direction T through the scalding medium 18 located in the scalding channel 20. The partition walls 26, 27, starting from the base wall 28 which connects the partition walls 26, 27, can have an identical height. Preferably, adjacent partition walls 26, 27 delimiting a scalding channel section have different heights, such that a partition wall 27 facing the dorsal side of the poultry 11 is lower than an opposite partition wall 26 facing the breast side of the poultry 11. The different heights of the partition walls 26, 27 can be provided throughout along the entire scalding channel 20, that is to say along the linear transport lines 21 to 23 and the curved connecting lines 24, 25. The height difference can optionally also be provided only in some regions. With regard to the extent of the height difference, the partition wall 27 facing the dorsal side can be at least one centimetre, optionally also at least two centimetres and further optionally also at least three centimetres lower than the partition wall 26 facing the breast side. The difference can of course also be greater than three centimetres and less than one centimetre. It is further possible that different height differences between the partition walls 26, 27 are provided along the scalding channel 20, for example one centimetre in the region of the linear transport lines 21 to 23 and three centimetres in the region of the curved connecting lines 24, 25. The height of at least one of the partition walls 26, 27 of each scalding channel section is particularly preferably configured so as to be variably adjustable. This can be, for example, mechanical and/or motor-driven adjustability of the partition wall 27 facing the dorsal side. Both partition walls 26, 27 are optionally also adaptable in terms of their height.

The partition walls 26, 27, starting from the base wall 28, can be configured so as to be perpendicularly upwards and planar. As described hereinbefore, the partition walls 26, 27 have at their free edges guiding elements 46, 47 which are formed, for example, as a prolongation of the partition walls 26, 27 (see in particular FIG. 10) or separately. Particularly preferably, at least one of the partition walls 26, 27 of a scalding channel section has, at least on an inner side facing the transport line 21 to 23, a shape which is adapted at least in some regions to the contour of the poultry 11. This does not necessarily describe a reproduction of the exact body shape of the poultry 11. Rather, the adaptation to the contour refers to a form which guides the scalding medium 18 to those regions of the poultry 11 in which it is particularly required. In an embodiment which is not shown, only the inner side of the partition wall 27 facing the dorsal side, for example, is correspondingly configured. Preferably, however, both partition walls 26, 27 are configured such that the scalding channel 20 is partially made narrower. To this end, the partition walls 26, 27 are not planar and have, starting from the free edges and a profile that is initially perpendicular to the base wall 28, an inwardly directed profile which first guides the scalding medium 18 inwards in the direction of the poultry 11 to be scalded, is then oriented, in the region of the poultry 11 to be scalded, perpendicularly to the base wall 28 in order to make the scalding channel 20 narrower and then, oriented outwards again, runs to the original width of the scalding channel 20 and finally ends oriented perpendicularly to the base wall 28 again. Other shaping and contour profiles of the partition walls 26, 27 can likewise be used. A shaping that is actually adapted to the outer geometry of the poultry 11 to be scalded can also be implemented in one partition wall 26 or 27 or in both partition walls 26, 27.

The scalding tank 17 can in principle be filled with scalding medium 18 in any manner. Optionally, filling by means of the means 30 is ensured. Preferably, in order to introduce the (fresh) scalding medium 18 and to form a counterflow directed contrary to the transport direction T, there is arranged in output region A of the poultry 11 from the scalding tank 17 at least one nozzle device (not explicitly shown) for introducing clean, preferably warmed water, while in the input region E of the poultry 11 into the scalding tank 17 there is formed at least one outlet (not explicitly shown) for discharging the contaminated water. The position of the nozzle device and/or of the or each outlet can vary and is not limited to end walls 14, 15 of the scalding tank 17. Irrespective of the nozzle device and the outlet for generating the counterflow and discharging at least some of the supplied water, there is associated with the scalding tank 17 at least one outlet valve 48 for discharging scalding medium 18 and/or for changing the fill level of the scalding tank 17. The number and positioning of the outlet valves 48 can vary. For cleaning the scalding medium 18, a filter device, not explicitly shown, is optionally provided, by means of which contaminated scalding medium 18 can be removed from and, optionally after being cleaned, returned to the scalding tank 17. The filter device can be, for example, a simple sieve. In other embodiments, it can also comprise, for example, pumps with corresponding filters.

The embodiment in which the or each pump device 34 is associated with only a single transport line 21 to 23 has already been described hereinbefore. To this end, a turbine 40 of each pump device 34 is arranged in a region of a breakthrough 49 of the base wall 28 of the scalding channel section in order to establish a flow connection between a scalding channel section and the receiving compartment 31, wherein the turbine 40 is shielded at least partially with respect to the scalding channel section by a cap or cover 50 which is arranged and formed spaced apart from the turbine 40 (see in particular FIGS. 4 and 5). The cover 50 can have various configurations and comprises at least one opening 51. The scalding medium 18 that is located in the scalding channel 20 and the scalding medium 18 that flows over the partition walls 26, 27 on both sides is drawn by suction in the region of the base wall 28, via the or each opening 51 and the breakthrough 49, out of the scalding channel 20 into the receiving compartment 31 and fed via the free spaces 29 back into the scalding channel 20 again from above, so that scalding medium circulation is ensured. The above-described counterflow of fresh water from the output region A in the direction towards the input region E can be used in addition to this circulation.

Alternatively, or preferably in addition to the or each pump device 34 described above, at least one turbulence-generating body (not explicitly shown) is arranged along the scalding channel 20 as a means for generating turbulence and/or flow of the scalding medium 18, which turbulence-generating body can be driven in rotation by means of a drive shaft which is oriented horizontally and is oriented transversely to the transport direction T of the poultry 11. Such a so-called vortex water turbine is arranged in particular in the region of the curved connecting lines 24, 25 but can ultimately be positioned at any position along the scalding channel 20.

In the region of the side walls 12, 13 of the scalding tank 17 there is formed at least one closable opening 54 for access to the pressure chamber 35, preferably in the region of the input region E. The closable opening 54 is, for example, a flap or a door. A plurality of these flaps/doors can be formed along the side walls 12, 13 and of course also at the end walls 14, 15.

Associated with the apparatus 10 is a control device 55 at least for controlling and/or regulating the means 30 for warming the scalding medium 18. In addition to the means 30, further components, such as, for example, the or each outlet valve 48, the nozzle unit, the drives 41 of the pump devices 34, potential actuators, for example for changing the height of the or each partition wall 26, 27, and further components, can also be connected to the control device.

As already described hereinbefore, the scalding tank 17 can have different scalding medium states, for example a "low level" $L_L$ and a "high level" $H_L$. In the case of the "low level" $L_L$ there is so little scalding medium 18 in the scalding tank 17 that the poultry 11 is transported freely and oriented downwards by gravity above the surface of the scalding medium 18 that is located in the scalding tank 17, in particular in the receiving compartment 31 beneath the scalding channel 20. The poultry 11 is then exposed solely to the overflowing scalding medium 18, which strikes the poultry 11 in the scalding channel 20 from above on both sides over the entire length of the scalding channel 20. In the case of the "high level" $H_L$, the poultry 11 is immersed completely, in particular up to the feet, in the scalding medium 18, so that the entire body of the poultry 11 is pulled through the scalding medium 18. Irrespective thereof, scalding medium 18 can also overflow into the scalding channel 20 from above on both sides. The scalding medium 18 can also have any height between "low level" $L_L$ and "high level" $H_L$, so that the poultry 11 is transported through the scalding channel 20 partially immersed. Suction with the or each pump device 34 not only results in the scalding medium 18 being drawn by suction out of the scalding channel 20 at the bottom. The suction effect also leads to the poultry 11 being "pulled" out of the floating position into a position in which it is hanging substantially downwards and is thus stabilised. The scalding medium 18 overflowing from above then strikes evenly aligned poultry 11, or assists with aligning the poultry 11 for an efficient scalding process.

The apparatus 10 is not limited to 180-degree deflections. There are of course also embodiments in which two or more than two transport lines 21 to 23 are connected, for example, by a 90-degree deflection. The implementation according to the invention of the overflow on both sides and of the other embodiments for the 180-degree deflection applies correspondingly also for the 90-degree deflection and any other redirection. It is also possible that a pump device 34 is arranged in the or each curved scalding channel section.

The or each pump device 34 is arranged in the receiving compartment 31 to draw the scalding medium 18 by suction out of the scalding channel 20 and to pump the scalding medium 18 back into the scalding channel 20 via the free spaces 29, whereby it is permanently situated in the scalding medium 18 and this acts on the pump body 38. The vertically oriented drive shaft 39 is mounted in a bearing sleeve 56 which is guided via a conical cover 57 through the base wall 16 of the scalding tank 17 and is connected thereto. The drive shaft 39 is sealed with respect to the bearing sleeve 56 in the outlet region of the drive shaft 39 out of the bearing sleeve 56 by a first seal 58. Furthermore, an additional labyrinth seal 59 is additionally provided, which, starting from the turbine 40, is located within the bearing sleeve 56 behind the seal 58 and protects bearing rings 60, 61 against the ingress of water. Approximately at the level of the labyrinth seal 59, an opening 62 is provided in the bearing sleeve 56, which opening guides water that enters the bearing sleeve 56 out of the bearing sleeve 56 even before it reaches the labyrinth seal 59 and the bearing rings 60, 61. However, other embodiments in respect of the mounting and/or fastening of the pump body 38 and the drive shaft 39 are likewise possible.

The method will be explained in greater detail hereinbelow with reference to the drawing.

The invention relates to methods for scalding slaughtered poultry 11. To this end, the poultry 11, hanging by the feet (by the legs is to be understood synonymously), is transported through a scalding tank 17, which is at least partially filled with liquid scalding medium 18, by means of a transport means 19 in a transport direction T from an input region E to an output region A along a transport channel 20 comprising linear and curved transport channel sections. Warmed scalding medium 18 is supplied to the scalding tank 20, or scalding medium 18 that is present is warmed by means 30 for warming and/or supplying the scalding medium 18. Turbulence is generated in the scalding medium 18 within the scalding tank 20 by means of at least one turbulence-generating body 33, whereby the scalding medium 18 is guided out of a receiving compartment 31 beneath the scalding channel 20 in some regions back into the scalding channel 20 from above. The scalding process is carried out by transporting the poultry 11 along the scalding channel 20.

This method is distinguished according to the invention in that the scalding medium 18, by means of at least one pump device 34, is drawn by suction out of the scalding channel 20 from beneath and pumped back into the scalding channel 20 from above over the entire length of the scalding channel 20, that is to say in the region of the linear and of the curved scalding channel sections, on both sides thereof. The scalding medium 18 thus flows into the scalding channel 20 from above on both sides along the transport lines 21 to 23 and the connecting lines 24, 25 and evenly strikes the hanging poultry 11, which is preferably transported continuously. In the case of a fill level "low level" $L_L$, scalding of the poultry 11 takes place solely via the scalding medium 18 overflowing on both sides. In the case of a fill level between "low level" $L_L$ and "high level" $H_L$ and in the case of a fill level "high level" $H_L$, scalding takes place by a combination of the scalding medium 18 located in the scalding channel 20 and the scalding medium 18 flowing into the scalding channel 20 from above on both sides along the transport lines 21 to 23 and the connecting lines 24, 25.

The poultry 11 is preferably transported sideways through the scalding channel 20 delimited by the mutually opposite partition walls 26, 27, in such a manner that the poultry 11, as it is transported, is oriented with a dorsal side facing one partition wall 27 and with a breast side facing the opposite partition wall 26, wherein a larger volume of scalding medium is fed back into the scalding channel 20 from above over the partition wall 27 facing the dorsal side than over the partition wall 26 facing the breast side. This option exists both for the linear transport lines 21 to 23 and for the curved connecting lines 24, 25. In addition to the internally circulating scalding medium 18, it is further possible additionally to supply fresh water, starting from the output region A in the direction towards the input region E, in order to generate a counterflow contrary to the transport direction T of the poultry 11, so that the poultry 11 is transported against the flow of the fresh water and contaminated scalding medium 18 collects in the input region E and the poultry 11 is transported through increasingly cleaner scalding medium 18 in the direction towards the output region A. Some or all of the scalding medium 18 can be cleaned by means of a filter device during the scalding process or in a break in operation.

For the internal circulation of the scalding medium 18, the scalding medium is drawn out of the scalding channel 20 by suction and fed back into the scalding channel 20 as an overflow on both sides. To this end, scalding medium 18, by means of a plurality of pump devices 34, is drawn by suction out of the scalding channel 20 in the region of base walls 28 and pumped upwards on both sides of the scalding channel 20—through free spaces 29—so that it flows back into the scalding channel 20 from above on both sides, wherein in each case at least one pump device 34 serves either one scalding channel section or at least two scalding channel sections. In order additionally to introduce a "true counterflow" into the scalding tank 17, fresh water, preferably prewarmed fresh water, is pumped under pressure into the scalding channel 20 in the output region A contrary to the transport direction T. The fresh water supplied in the output region A by means of a (fresh) water access flows/streams downwards in the direction towards the (contaminated) water outlet situated at a lower level.

Finally, there is also the option that the overflowing scalding medium 18, which flows into the scalding channel 20 from above over the free edges of the partition walls 26, 27, is guided into the scalding channel 20 not only transversely to the transport direction T but in particular also in the transport direction T of the poultry 11. To this end, guiding elements 46, 47 are correspondingly shaped and/or arranged, in order to direct the scalding medium 18 individually and ultimately from all sides, or in all directions, into the scalding channel 20.

A preferred setting of the pump device 34 in respect of the drive speed of the turbines 40 in the case of a fill level of the scalding tank 17 with scalding medium 18 between the "low level" $L_L$ and a fill level between "low level" $L_L$ and "high level" $H_L$ is about 900 rpm. In the case of a fill level "high level" $H_L$, a drive speed of the turbines of about 540 rpm is preferred (see in particular FIG. 10). Other drive speeds can of course also be implemented.

The method is particularly preferably carried out with an apparatus as described herein.

The invention claimed is:

1. An apparatus, configured and adapted for scalding slaughtered poultry, comprising:
   an elongate scalding tank, which is closed on all sides by side walls and end walls and at the bottom by a base wall and which is open at the top, for receiving and for holding a liquid scalding medium;
   a transport means, arranged above the scalding tank, for transporting the poultry a hanging manner within the scalding tank along a scalding channel formed of a plurality of scalding channel sections from an input region to an output region;
   wherein;
      at least two transport lines for the poultry are formed within the scalding tank, each from one end wall of the scalding tank to an opposite end wall of the scalding tank;
      the transport lines are connected to one another by curved connecting lines for 180-degree deflection;
      each transport line and each connecting line is delimited by two partition walls, which are arranged spaced apart from one another transversely to a transport direction, and a base wall to form linear scalding channel sections which are open at the top and curved scalding channel sections which are open at the top;
      partition walls of adjacent scalding channel sections and partition walls that are situated adjacent to outside walls of the scalding tank are arranged spaced apart from one another to form a free space for the scalding medium;
      means for supplying and/or warming the scalding medium are associated at least with the free spaces of adjacent scalding channel sections;
      there is formed beneath at least parts of the scalding channel, namely at least between the base walls of the linear scalding channel sections and the base wall of the scalding tank, a receiving compartment for scalding medium which, together with the free spaces, forms a common chamber with which there is associated at least one turbulence-generating body for generating turbulence and/or flow of the scalding medium in the scalding tank;
      the receiving compartment extends beneath the entire scalding channel, that is to say between the base walls of the linear and of the curved scalding channel sections on the one hand and the base wall of the scalding tank on the other hand; and
      there is arranged in the receiving compartment, which as a result extends into a region of the curved scalding channel sections, at least one pump device as the turbulence-generating body for forming a pressure chamber which acts along the entire scalding channel.

2. The apparatus according to claim 1, wherein the at least one pump device comprises at least two pump devices arranged along each transport line and each pump device comprises a pump body having a vertically oriented drive shaft with a rotationally driveable turbine and a drive, wherein at least the turbine in the region of the base wall of the or each scalding channel section is arranged inside the scalding tank and the drive is arranged outside the scalding tank.

3. The apparatus according to claim 1, wherein the at least one pump device comprises at least one separate pump device associated with each linear scalding channel section.

4. The apparatus according to claim 1, wherein the at least one pump device comprises at least one common pump device associated with at least two scalding channel sections running adjacent and parallel to one another.

5. The apparatus according to claim 1, wherein the at least one pump device comprises at least one row, preferably two rows, of pump devices formed and arranged transversely to a longitudinal extent of the linear scalding channel sections, wherein a maximum distance of the pump devices from the curved scalding channel sections is about 3.5 m.

6. The apparatus according to claim 5, wherein two or more of the pump devices of a row form a pump unit which, together with centre units with linear scalding channel section portions and end units with linear scalding channel section portions and curved scalding channel section portions, forms an apparatus of modular construction having the continuous scalding channel throughout.

7. The apparatus according to claim 1, wherein adjacent partition walls delimiting a scalding channel section have different heights, such that a partition wall facing a dorsal side of the poultry is lower than an opposite partition wall facing a breast side of the poultry.

8. The apparatus according to claim 7, wherein the partition wall facing the dorsal side is at least one centimetre, optionally also at least two centimetres and further optionally also at least three centimetres lower than the partition wall facing the breast side.

9. The apparatus according to claim 1, wherein a height of at least one of the partition walls of each scalding channel section is configured so as to be variably adjustable.

10. The apparatus according to claim 1, wherein at least one of the partition walls of one of the scalding channel sections has, at least on an inner side facing the transport line, a shape which is adapted at least in some regions to a contour of the poultry.

11. The apparatus according to claim 1, wherein in order to form a counterflow oriented contrary to the transport direction of the poultry, there is arranged in the output region of the poultry from the scalding tank at least one nozzle device for introducing clean, preferably warmed water, while in the input region of the poultry into the scalding tank there is formed at least one outlet for discharging the contaminated water.

12. The apparatus according to claim 1, wherein a turbine of each of the at least one pump device is arranged in a region of a breakthrough of the base wall of the scalding channel section in order to establish a flow connection between a scalding channel section and the receiving compartment, wherein the turbine is shielded at least partially with respect to the scalding channel section by a cover which is arranged and formed spaced apart from the turbine.

13. The apparatus according to claim 1, wherein a turbine of each of the at least one pump device is arranged in a region of a breakthrough of a base wall and/or partition wall of at least two scalding channel sections in order to establish a flow connection between at least two adjacent scalding channel sections and the receiving compartment, wherein the turbine is shielded completely with respect to the free space formed between adjacent partition walls of adjacent scalding channel sections.

14. The apparatus according to claim 1, wherein there is arranged along the scalding channel at least one turbulence-generating body as the means for generating turbulence and/or flow of the scalding medium, which turbulence-generating body can be driven in rotation by a drive shaft which is oriented horizontally and is oriented transversely to the transport direction of the poultry.

15. The apparatus according to claim 1, wherein at least one closable opening for accessing the pressure chamber is formed in a region of the side walls of the scalding tank, preferably in a region of the input region.

16. The apparatus according to claim 1, wherein at least one outlet valve is associated with the scalding tank.

17. The apparatus according to claim 1, wherein a control device at least for controlling and/or regulating the means for warming the scalding medium is associated with the apparatus.

18. A method for scalding slaughtered poultry, comprising the steps:
transporting the poultry, hanging by feet, through a scalding tank, which is at least partially filled with liquid scalding medium, by a transport means in a transport direction from an input region to an output region along a scalding channel, wherein the scalding channel comprises linear and curved scalding channel sections;
warming and/or supplying the scalding medium by means for warming and/or supplying the scalding medium; and
generating turbulence in the scalding medium within the scalding tank by at least one turbulence-generating body, whereby the scalding medium is guided from a receiving compartment beneath the scalding channel in some regions back into the scalding channel from above;
wherein the scalding medium, by at least one pump device, is drawn by suction out of the scalding channel from beneath and pumped back into the scalding channel on both sides thereof from above over an entire length of the scalding channel, that is to say in a region of the linear and of the curved scalding channel sections.

19. The method according to claim 18, wherein the poultry is transported sideways through the scalding channel delimited by mutually opposite partition walls, such that the poultry, as it is transported, is oriented with a dorsal side facing one partition wall and with a breast side facing an opposite partition wall, wherein a larger volume of scalding medium is fed back into the scalding channel from above over the partition wall facing the dorsal side than over the partition wall facing the breast side.

20. The method according to claim 18, further comprising supplying fresh water, starting from the output region in a direction towards the input region, in order to generate a counterflow contrary to the transport direction of the poultry, so that the poultry is transported against a flow of the fresh water and contaminated scalding medium collects in the input region and the poultry is transported in a direction towards the output region through increasingly clean scalding medium.

21. The method according to claim 18, further comprising immersing the poultry in the scalding medium, as the poultry is transported through the scalding channel, either completely, partially or not at all.

22. The method according to claim 18, further comprising cleaning the scalding medium by a filter device.

23. The method according to claim 18, wherein the scalding medium itself circulates within the scalding tank, namely is drawn by suction out of the scalding channel and fed back into the scalding channel as an overflow on both sides, and prewarmed fresh water is pumped under pressure into the scalding channel in the output region contrary to the transport direction.

24. The method according to claim 18, wherein the scalding medium, by a plurality of pump devices, is drawn by suction out of the scalding channel in a region of base walls and pumped upwards on both sides of the scalding channel, so that it flows back into the scalding channel from above on both sides, wherein at least one pump device serves either one scalding channel section or at least two scalding channel sections.

25. The method according to claim 18, wherein the method is carried out with an apparatus according to claim 1.

* * * * *